(12) United States Patent
Blankenship

(10) Patent No.: US 7,070,365 B1
(45) Date of Patent: Jul. 4, 2006

(54) DRILL BIT ASSEMBLY FOR BOMB DEACTIVATION AND OTHER APPLICATIONS

(75) Inventor: George R. Blankenship, 8503 Camberwell, San Antonio, TX (US) 78254

(73) Assignee: George R. Blankenship, San Antonio, TX (US)

( * ) Notice: Subject to any disclaimer, the term of this patent is extended or adjusted under 35 U.S.C. 154(b) by 418 days.

(21) Appl. No.: 10/411,519

(22) Filed: Apr. 10, 2003

Related U.S. Application Data

(60) Provisional application No. 60/371,890, filed on Apr. 10, 2002.

(51) Int. Cl.
*B23B 41/00* (2006.01)

(52) U.S. Cl. .............................. 408/1 R; 408/7; 408/14; 408/56; 86/50

(58) Field of Classification Search ................ 408/1 R, 408/7, 14, 56, 61, 97, 110, 129, 50
See application file for complete search history.

(56) References Cited

U.S. PATENT DOCUMENTS

| 2,510,203 | A | * | 6/1950 | Andreasson | 408/56 |
|---|---|---|---|---|---|
| 2,973,021 | A | * | 2/1961 | Crossen | 81/430 |
| 3,487,748 | A | * | 1/1970 | Grage | 409/136 |
| 3,874,808 | A | * | 4/1975 | Zaccardelli et al. | 408/1 R |
| 4,431,350 | A | * | 2/1984 | Abrahamson | 408/11 |
| 4,563,924 | A | * | 1/1986 | Runkle et al. | 82/1.11 |
| 4,570,952 | A | * | 2/1986 | Heimbigner et al. | 279/20 |
| 4,676,319 | A | * | 6/1987 | Cuthbertson | 169/70 |
| 4,740,117 | A | * | 4/1988 | Schaff Deleury et al. | 408/72 R |
| 4,743,145 | A | * | 5/1988 | Hendricks et al. | 408/59 |
| 4,749,316 | A | * | 6/1988 | Hendricks | 408/239 R |
| 4,818,157 | A | * | 4/1989 | Kouvelis | 408/240 |
| 4,841,817 | A | * | 6/1989 | Tsui et al. | 76/101.1 |
| 4,850,755 | A | * | 7/1989 | Spencer | 408/56 |
| 4,907,660 | A | * | 3/1990 | Staggs et al. | 175/320 |
| 5,006,021 | A | * | 4/1991 | Wheetley | 408/1 R |
| 5,012,566 | A | * | 5/1991 | Getz, Jr. | 29/265 |
| 5,037,250 | A | * | 8/1991 | Kenny | 408/57 |
| 5,044,451 | A | * | 9/1991 | Fischer | 175/220 |
| 5,356,245 | A | * | 10/1994 | Hosoi et al. | 408/56 |
| 5,601,386 | A | * | 2/1997 | Wells | 408/57 |
| 5,630,682 | A | * | 5/1997 | Davey | 408/67 |

(Continued)

*Primary Examiner*—Boyer D. Ashley
*Assistant Examiner*—Michael W. Talbot
(74) *Attorney, Agent, or Firm*—Garlick Harrison & Markison, LLP; James A. Harrison

(57) ABSTRACT

A drill bit assembly is formed to drill into an object while reliably conducting a fluid onto a point being drilled and subsequently into the object being drilled includes a sleeve that is bored and threaded and cut flush to substantially mate with the outside surface of a conducting tube. An elbow connector is mounted within the sleeve and receives a fluid from a tube coupled thereto. The drill bit assembly further includes a telescoping conduction tube for conducting fluid about the drill bit as it rotates and into an opening created by the drill bit. The telescoping conduction tube axially slides about the conduction tube and also conducts fluid about the drill bit while slidingly mating with the conduction tube to minimally leak the fluid. The drill bit assembly further includes a telescoping outer tube that defines a 45 degree cut at a drilling point end of the drill bit, wherein the 45 degree cut flushes cutting debris away from the drill bit thereby substantially reducing clogging of the fluid conduction tube. The drill bit assembly may be used in connection with any object being drilled for which temperature or sparking is to be reduced or eliminated.

21 Claims, 28 Drawing Sheets

U.S. PATENT DOCUMENTS

| | | | | |
|---|---|---|---|---|
| 5,832,966 | A * | 11/1998 | Nickens et al. | 141/51 |
| 5,888,031 | A * | 3/1999 | Buck et al. | 408/56 |
| 5,899,644 | A * | 5/1999 | Buck et al. | 408/97 |
| 5,947,657 | A * | 9/1999 | Lipohar et al. | 408/97 |
| 5,967,716 | A * | 10/1999 | Katsuzawa et al. | 409/134 |
| 6,105,595 | A * | 8/2000 | Jensen | 137/15.12 |
| 6,132,147 | A * | 10/2000 | Kazirskis | 408/1 R |
| 6,158,929 | A * | 12/2000 | Fisher | 408/1 R |
| 6,722,447 | B1 * | 4/2004 | Stepan et al. | 173/1 |
| 6,899,007 | B1 * | 5/2005 | Blankenship | 86/50 |
| 6,978,708 | B1 * | 12/2005 | Blankenship | 86/50 |
| 2002/0009341 | A1 * | 1/2002 | Vasudeva | 408/226 |
| 2005/0062285 | A1 * | 3/2005 | Hobson et al. | 285/179 |
| 2005/0105977 | A1 * | 5/2005 | Ishihara | 408/1 R |

* cited by examiner

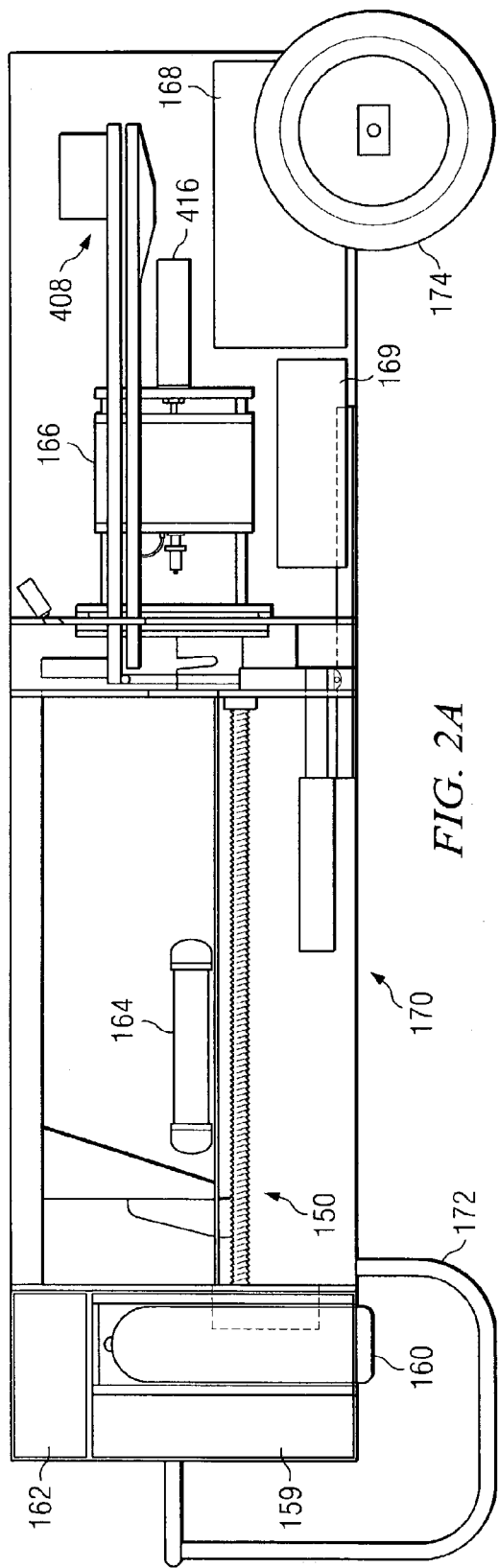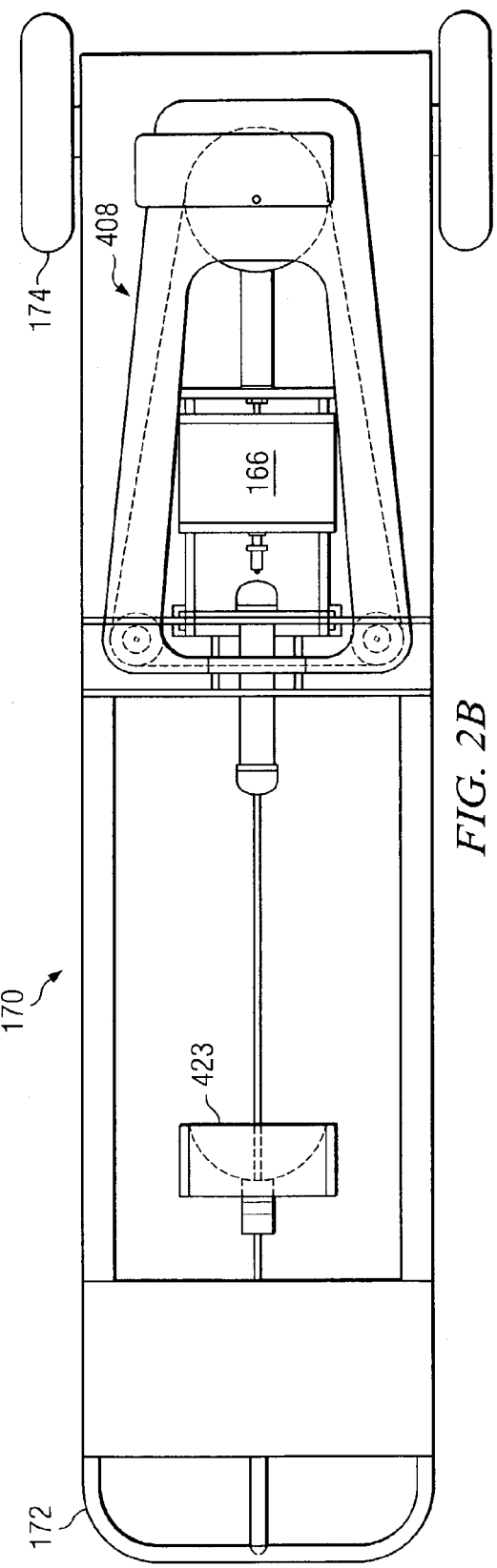
FIG. 2A
FIG. 2B

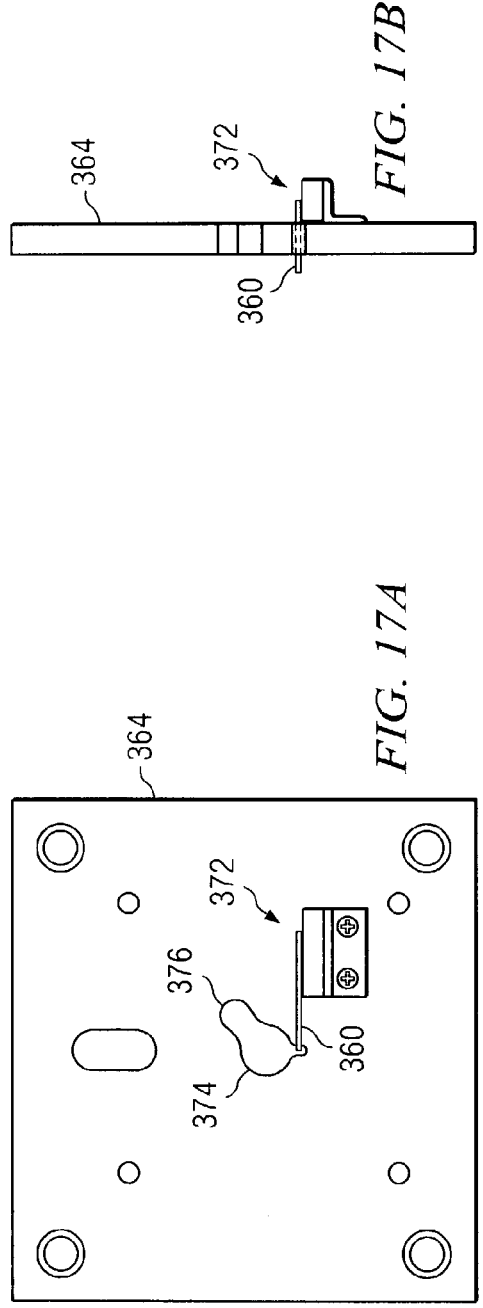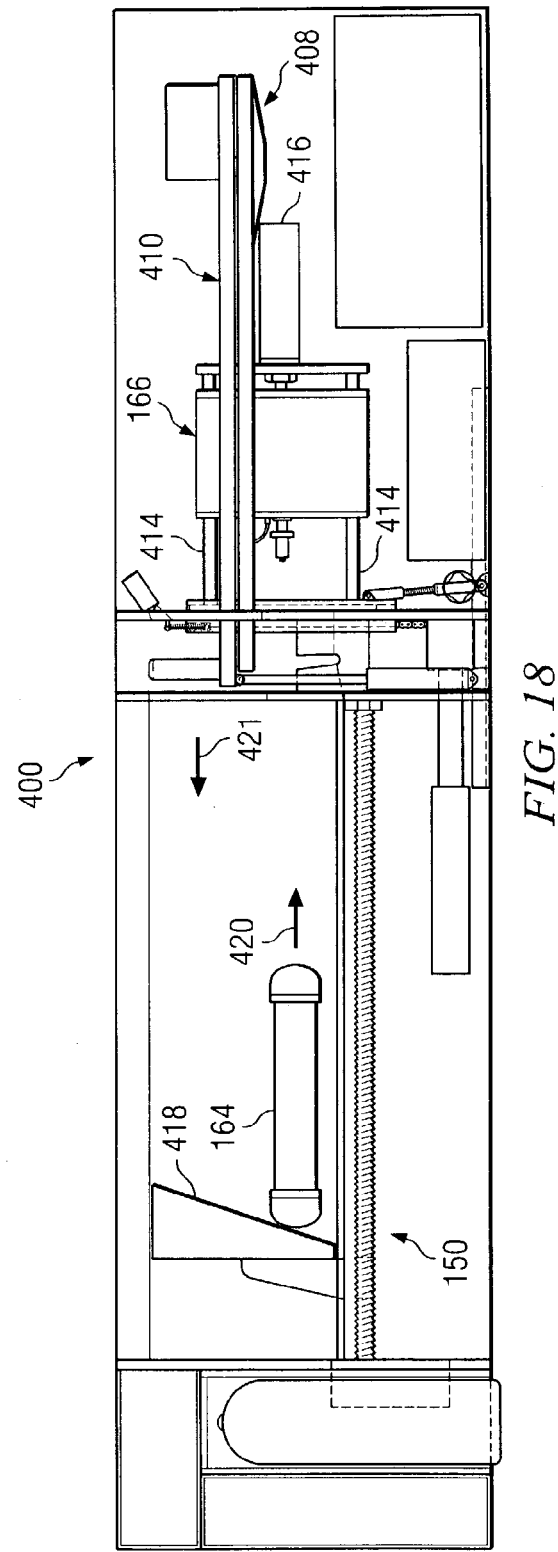

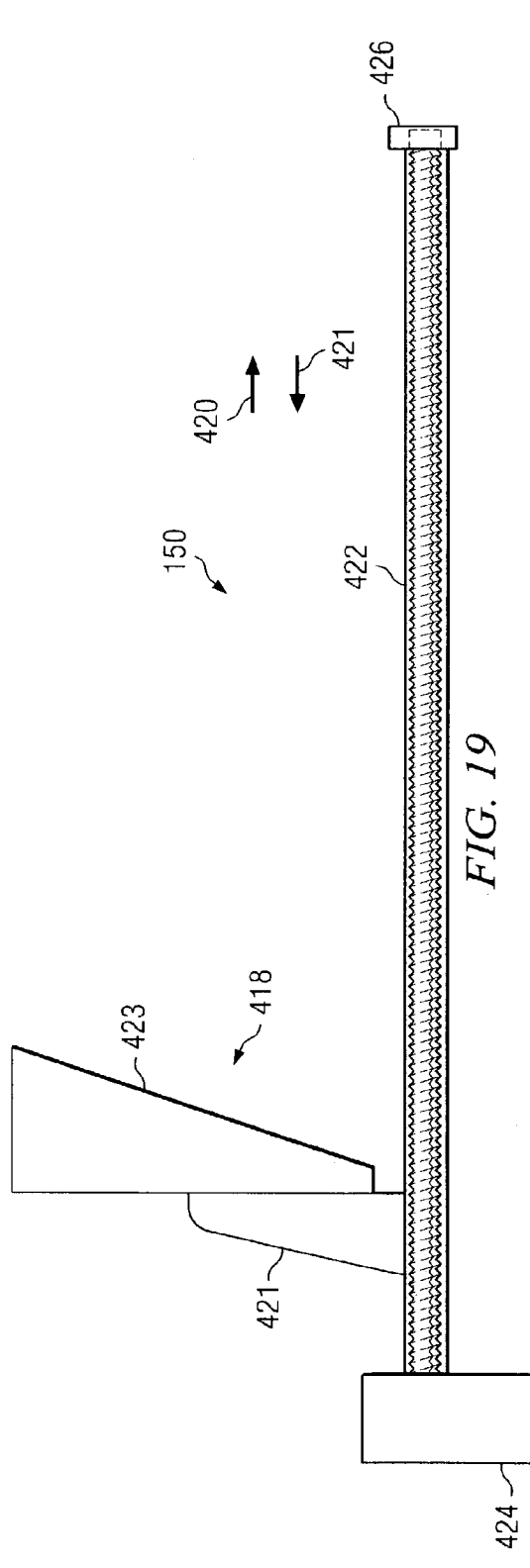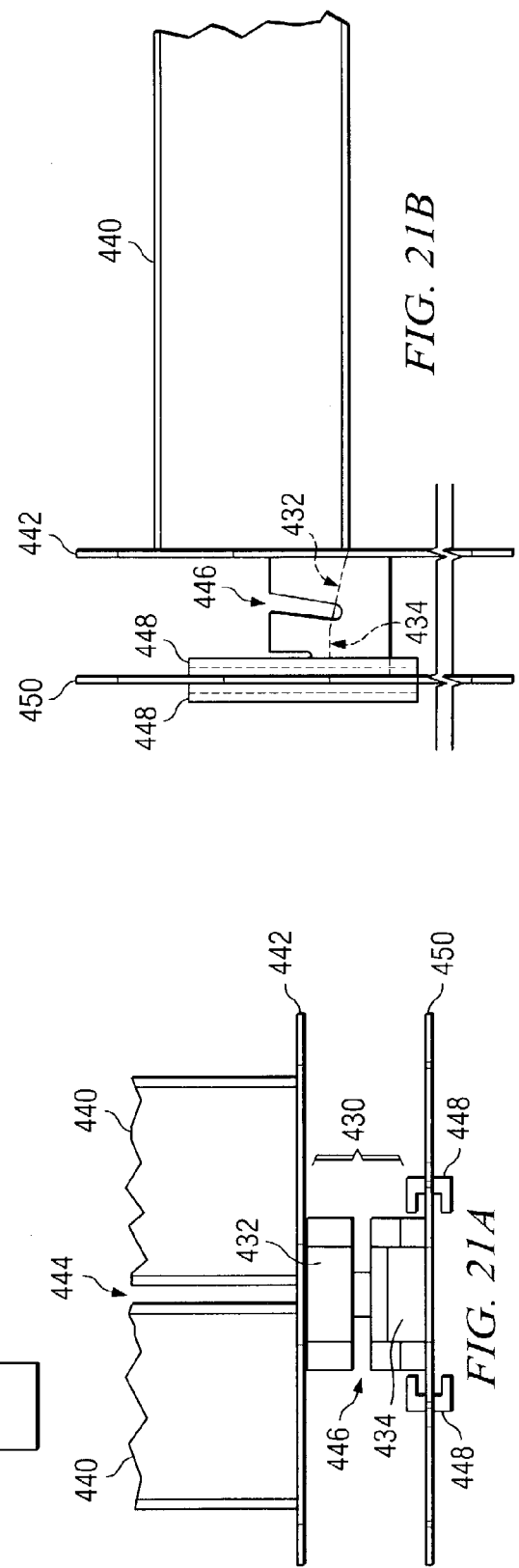

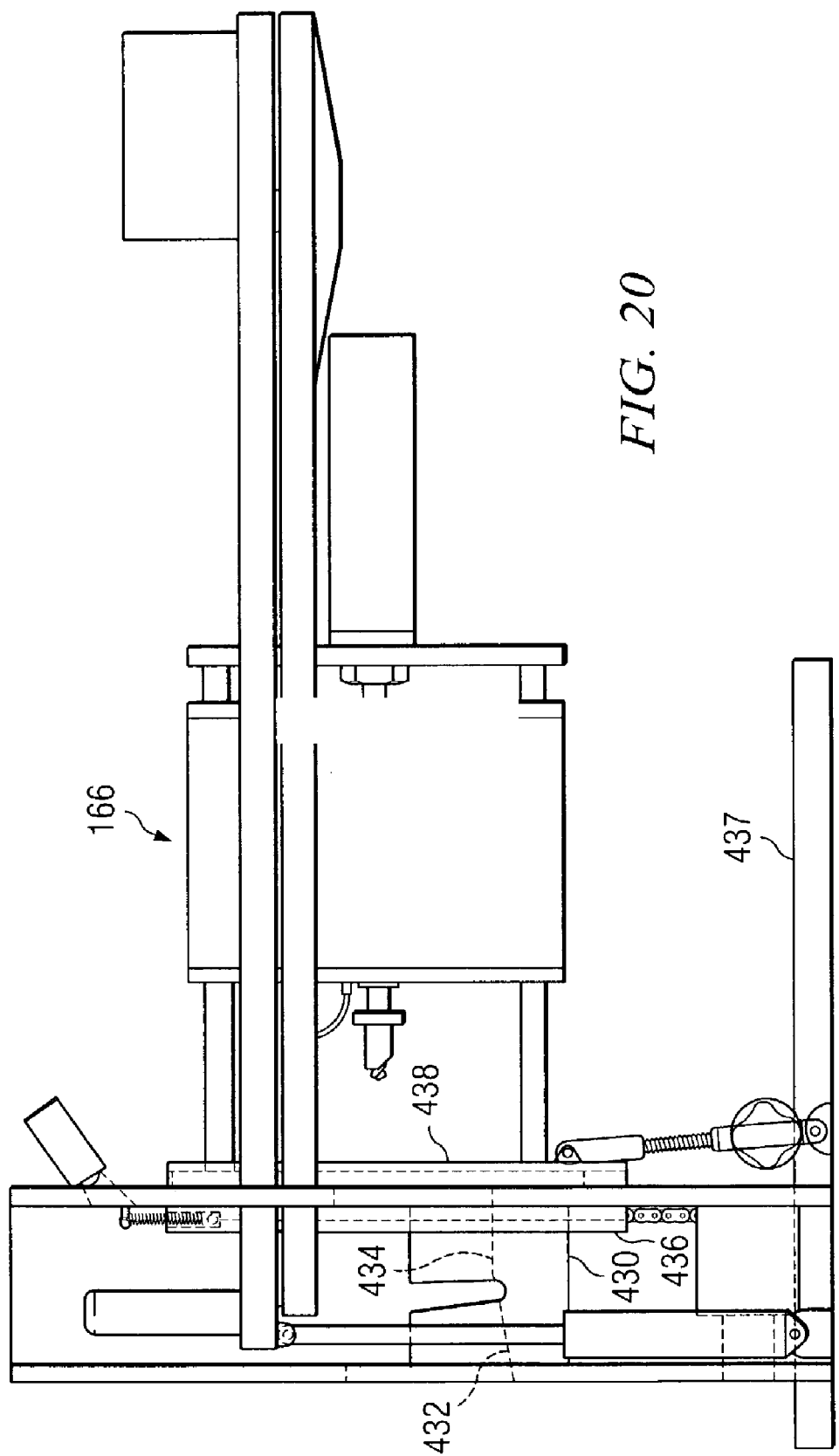

DRILL BIT ASSEMBLY FOR BOMB DEACTIVATION AND OTHER APPLICATIONS

CROSS-REFERENCE TO RELATED APPLICATIONS

This application claims priority to Provisional Patent Application having a Ser. No. 60/371,890 and a filing date of Apr. 10, 2002.

BACKGROUND

1. Field of the Invention

The present invention relates to equipment for drilling for deactivating bombs and other applications.

2. Related Art

Even before Timothy McVeigh blew up the Federal courthouse building in Oklahoma City and before the terrorist attacks of Sep. 11, 2001, a sad and quiet fact was that there are many members of our society that make explosive devices with mal-intent. Accordingly, every major police force has a bomb squad to deactivate and diffuse bombs that are found on a daily basis. One technique for disposing of a bomb is to simply detonate or disrupt the bomb in a controlled environment. Recently, however, equipment has been developed that can render certain types of explosive devices and bombs inert without requiring detonation. For example, FIGS. 1A through 1F describe a device that has been in development and publicly displayed since August of 2000. In general, the device comprises a trough with angled sides and a pneumatically driven shoe that pushes the bomb into a drill bit that drills a hole in the bomb and injects water into it to render the bomb inert.

As may be seen in FIG. 1A, a prior art device, shown generally at 100, requires an external carbon dioxide gas tank which must be left in a standing position, as well as an external battery to drive the device. FIG. 1A further illustrates a pipe bomb 104 that is within a trough. As may be seen generally at 106, a drill bit assembly is permanently placed at one end of the trough to receive and drill pipe bomb 104 as a pneumatically driven shoe ("pneumatic shoe") 102, shown in FIG. 1A, urges pipe bomb 104 towards drill bit assembly 106. Once the pipe bomb is in position, shuttle shoe 102 retracts as hold down spool 114 rotates to hold pipe bomb 104. As hold down spool 114 continues to hold pipe bomb 104 securely, shuttle shoe 102 moves forward to slowly urge bomb 104 into the drill bit until the bomb cap is penetrated. As may also be seen in FIG. 1A, an external fluid pump and supply 108 and an external controller 110 are coupled to the bomb deactivator of FIG. 1A. An external $CO_2$ tank 109 and battery 111 may also be seen. One problem with the system shown in FIG. 1A is that a significant number of external systems and devices must be coupled to the device for it to operate properly. Thus, setup time is longer than desirable when a live bomb needing deactivation is present. This setup time, if reduced, would minimize a technician's exposure to danger.

FIG. 1B is a partial side view of prior art trough 112 connected to bulkhead 113. FIG. 1C is a front view of bulkhead 113 illustrating the position of trough 112 in relation to drill hole 115 through which a drill bit (not shown) protrudes. The pneumatic shoe urges the bomb into the drill bit in order to penetrate the bomb.

FIGS. 1D and 1E illustrate a side view and a front view, respectively, of a prior art hold down spool. As may be seen in FIG. 1D, hold down spool 114 rotates downward in a direction shown generally at 116 to hold the bomb (of FIG. 1A) against trough 112.

FIG. 1F illustrates the prior art drilling mechanism. A gear motor 118 is coupled to an adapter 120 that in turn radially drives a keyless drill chuck 122 that holds a drill bit assembly. A drill depth sensor shown generally at 124 is used to initiate the next step in the process.

FIGS. 1G and 1H illustrate a side view and top view, respectively, of a drill motor assembly of a prior art device. A tube supply holder 128 may be seen in the drill motor assembly in the top view of FIG. 1H. Tube supply holder 128 is for receiving a fluid, which is water in the prior art, for conducting between a sleeve shown generally at 130 and a drill bit shown generally at 132. Referring now to the side view of the drill motor assembly shown in FIG. 1G, arrows shown extending from sleeve 130, which arrows are shown generally at 136, illustrate the semi-random nature in which the fluid, here water, is expelled towards the bomb that is being rendered inert. This prior art design is not optimal in that water is not directed into the bomb in an efficient manner, thereby spraying the water in a multitude of directions and decreasing the effectiveness with which it cools, prevents sparking, and washes away debris.

FIG. 1I is a side view of a prior art drill bit assembly. A drill bit includes a brass tube, or sleeve 130, a drill bit 132, and fluid being expelled from between drill bit 132 and sleeve 130 shown generally at 136, as discussed previously. Additionally, FIG. 1I illustrates a drill fluid supply tube 142 that is fixedly attached to sleeve 130. In the described embodiment of the prior art, drill fluid supply tube 142 is soldered into a drill aperture of brass tube (sleeve 130) creating a weak mechanical joint susceptible to failure. Additionally, as may be seen, a fender washer 146 is shown at one end of sleeve 130, which is for providing a fluid stop to keep fluid from flowing into the drill chuck (keyless drill chuck 122 of FIG. 1F). In this prior art device, sleeve 130 does not seal against the bomb until the drill bit has substantially or completely penetrated the bomb cap.

In operation, the system of FIGS. 1A–1I is advantageous in that it may be used to render a bomb, for example, a pipe bomb, inert. Thus, a bomb squad would not need to detonate or disrupt the bomb with a pan disrupter to render it non-explosive. One problem with the prior art system shown in FIGS. 1A–1I, however, is that the bomb deactivator is heavy, bulky, consists of many parts and must be assembled onsite, and is designed to render a pipe bomb inert of a specified size. Because pipe bombs are often made using pipes of different diameter, a bomb squad would be required to carry multiple prior art devices to a bombsite since they probably would not have advance knowledge of the size of the pipe bomb that is to be neutralized. With the prior art device, there is no way to verify that the process was effective, i.e., the pipe bomb was still in one piece. Additionally, it would be advantageous if a system could be prepared for use in less time thereby reducing the exposure of the bomb squad to the potentially explosive pipe bomb. Finally, a system that could more efficiently render the pipe bomb into a neutralized state would also be advantageous.

What is needed, therefore, is a bomb deactivator that reduces setup time and that may deactivate bombs of differing sizes.

SUMMARY OF THE INVENTION

A drill bit assembly is formed to drill into an object while reliably conducting a fluid onto a point being drilled and subsequently into the object being drilled. The drill bit assembly includes a drill bit permanently installed within an aperture of the hex stock that is held by a tool bit holder assembly formed as a part of a gear drive of a motor assembly. A conducting tube having an inside surface of a first specified diameter and an outside surface of a second diameter initially receives the fluid and conducts the fluid about the drill bit. To receive the fluid, a sleeve is mounted about the conducting tube. The sleeve is bored and threaded and cut flush to substantially mate with the outside surface of the conducting tube. Further, an elbow connector is mounted within the sleeve. The elbow connector receives a fluid from a tube coupled thereto and conducts the fluid into the sleeve and into the conducting tube. The conducting tube is machined to sealingly mate with an internally machined flange within the hex stock to prevent the fluid from leaking between the drill bit, the conducting tube and the hex stock.

The drill bit assembly further includes a telescoping conduction tube for conducting fluid about the drill bit as it rotates and into an opening created by the drill bit. The telescoping conduction tube axially slidingly mates with the conduction tube to minimally leak the fluid. The drill bit assembly, in one embodiment, further includes a telescoping outer tube that defines a 45 degree cut at a drilling point end of the drill bit, wherein the 45 degree cut is for flushing cutting debris away from the drill bit thereby substantially reducing clogging of the fluid conduction tube.

BRIEF DESCRIPTION OF THE DRAWINGS

A better understanding of the present invention can be obtained when the following detailed description of the preferred embodiment is considered with the following drawings, in which:

FIGS. 2A and 2B illustrate a side view and a top view, respectively, of a portable bomb deactivator formed according to one embodiment of the invention;

FIGS. 17A and 17B illustrate a front view and a side view, respectively, of forward drill bit head assembly plate with the drill depth micro-switch installed thereon according to one embodiment of the present invention;

FIG. 18 is a side cutaway view of one embodiment of the present invention;

FIG. 19 illustrates a linear actuator assembly according to one embodiment of the present invention;

FIG. 20 is a partial side cutaway view of the present invention;

FIGS. 21A and 21B illustrate a top view and a left side view, respectively, of the trough, bulkheads, and a vertical transition block according to one embodiment of the present invention;

DETAILED DESCRIPTION OF THE DRAWINGS

Figure 1A:
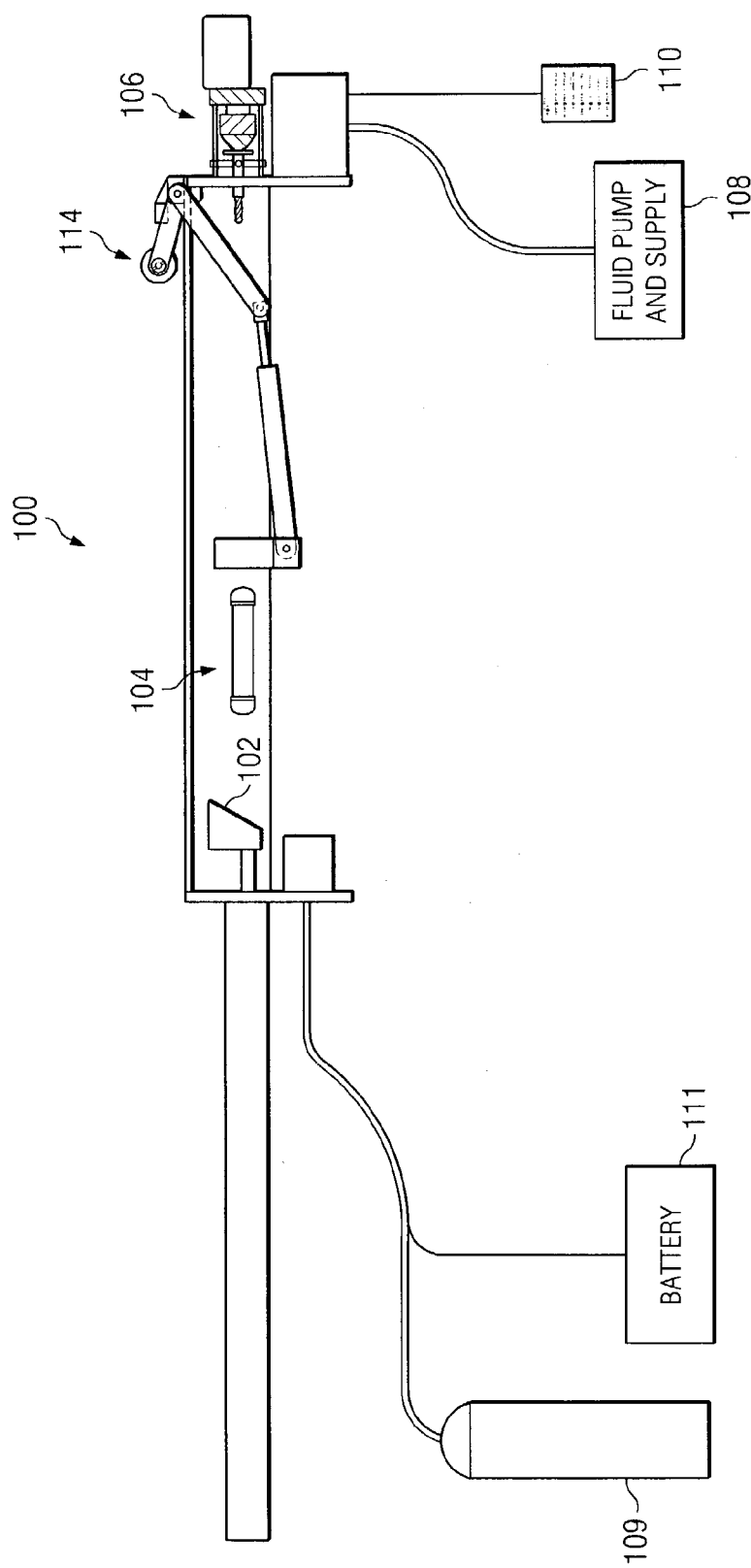
FIGS. 1A through 1I illustrate a prior art device.
Figure 1B:
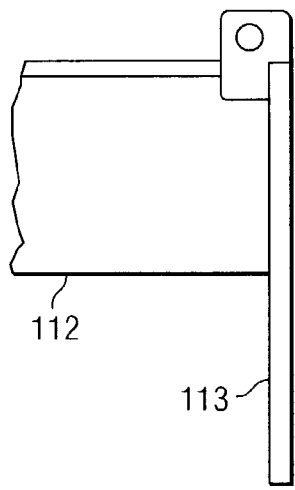
Figure 1C:
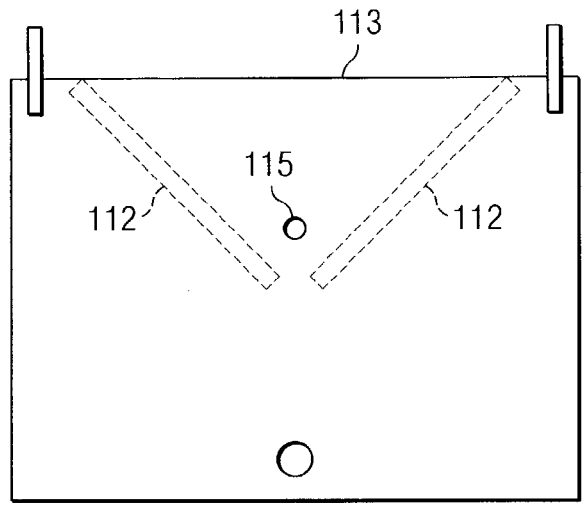
Figure 1D:
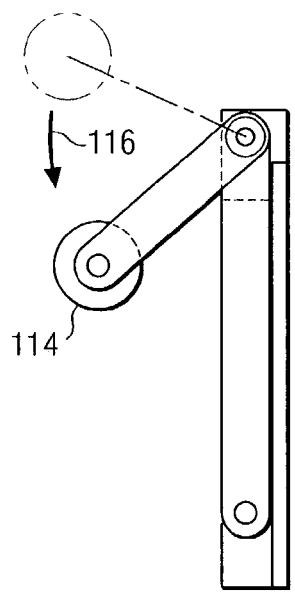
Figure 1E:
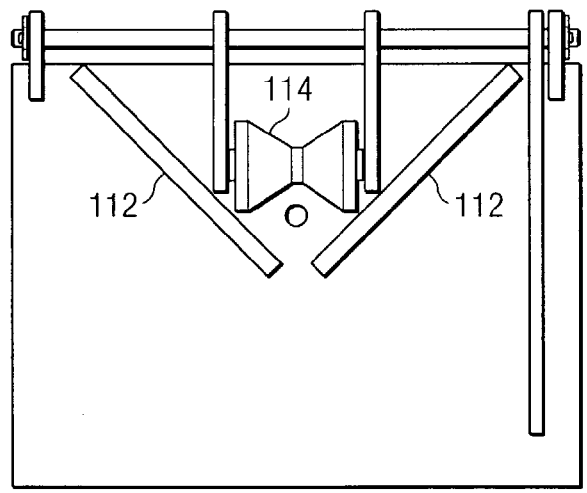
Figure 1F:
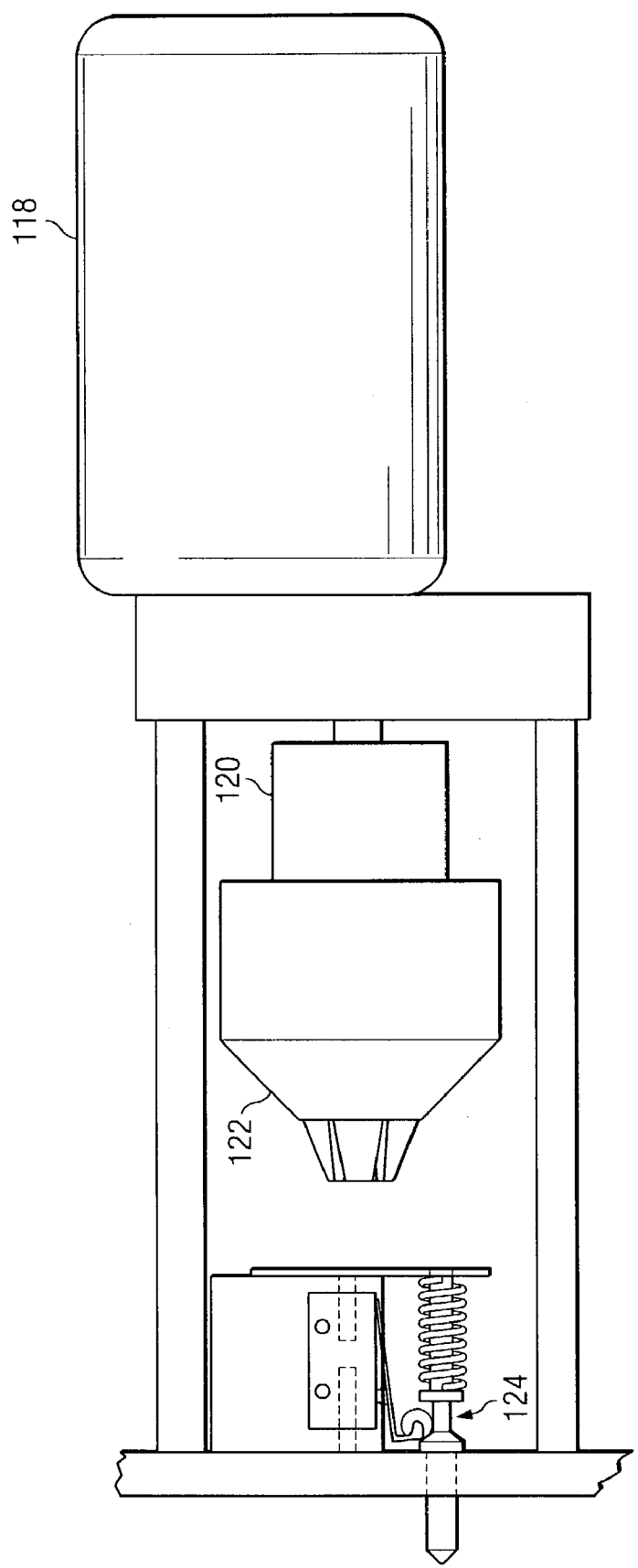
Figure 1G:
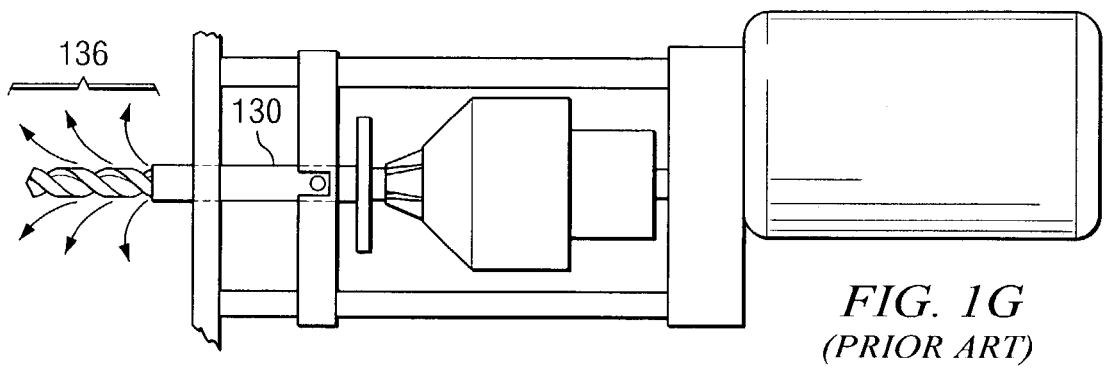
Figure 1H:
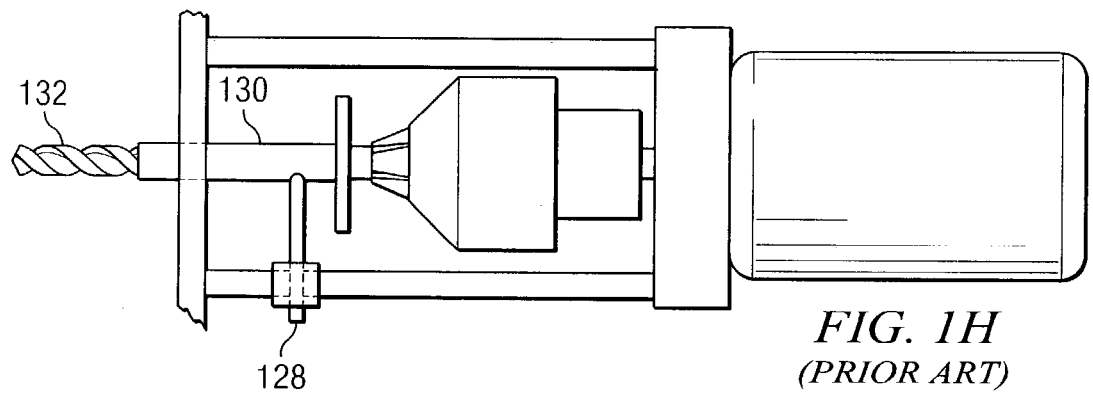
Figure 1I:
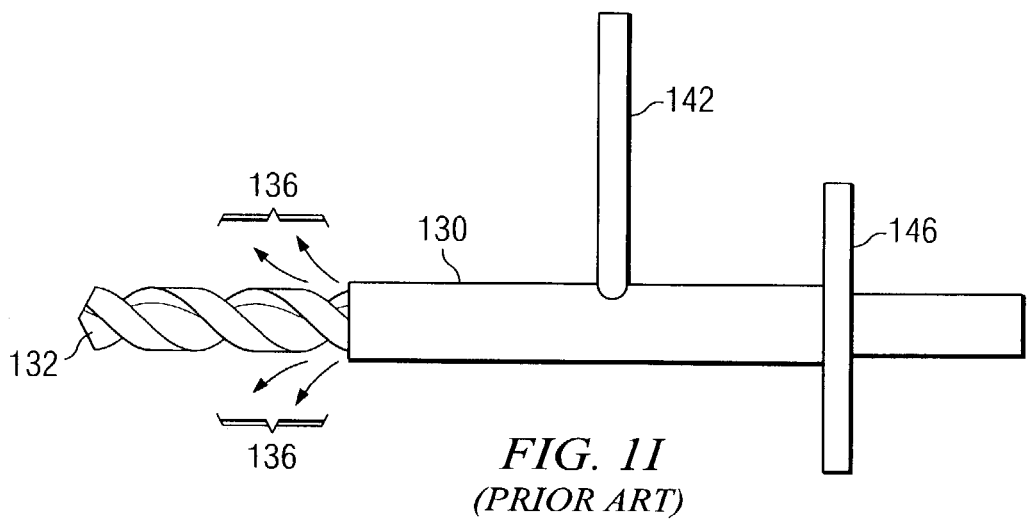

FIGS. 2A and 2B illustrate a side view and a top view, respectively, of a bomb deactivator formed according to one embodiment of the invention. More specifically, the bomb deactivator shown in FIG. 2A is illustrated with side panels removed to show the internal compartments therein. More specifically, an electronic control center is shown at 159, a $CO_2$ supply tank is shown at 160, a pneumatic control center is shown at 162, and a fluid supply with fluid supply pumps is shown at 169. Additionally, the linear actuator assembly, shown generally at 150, is shown with pipe bomb 164 (herein referred to as "bomb") in position for deactivation. A drill head assembly is shown at 166 and a power supply is shown at 168. Additionally, as may be seen in FIGS. 2A and 2B, the bomb deactivator may be installed within a dolly shown generally at 170, which include a handle 172 and a pair of wheels shown at 174. As such, the bomb deactivator is fully portable and self-contained and facilitates faster deactivation of a bomb. FIG. 2B illustrates the top view of the self contained mobile chassis for bomb deactivation. In this view, bomb 164 has been urged fully forward to drill head assembly 166 by linear actuator assembly 150. The linear actuator has withdrawn push shoe 423 to the starting position. Further, in one embodiment, drill head assembly 166 includes a camera (not shown in FIG. 2A) to enable a technician to view the drill head assembly while the bomb is being rendered inert.

In the embodiment illustrated by FIGS. 2A and 2B, linear actuator assembly 150 comprises a push shoe assembly, and a linear lead screw assembly. A shuttle trough is formed in a "V" to keep the bomb on the centerline of the bomb deactivator. The linear actuator assembly urges the bomb forward until it moves up a transition block and actuates a linear actuator micro-switch. The signal generated by the linear actuator micro-switch causes the linear actuator assembly to retract the push shoe to the starting position. At this time, a lock down plate moves to secure the bomb. Once the bomb is secure, drill head assembly, shown generally at 166, is vertically adjusted to the approximate center of the bomb cap, and then the drill head assembly is urged in a linear fashion by pneumatic cylinder 416 into the bomb. Drilling continues until the bomb cap is penetrated. After spraying fluid into the bomb to render it inert, band saw 408 is actuated to cut bomb 164 into at least two pieces.

In an alternate embodiment of the invention, the shuttle push shoe merely urges the bomb into a fingered aperture that holds the bomb in place while a separate pneumatic activation system urges the drill head assembly against the bomb as it is being held in place by the fingered aperture.

Figure 3:
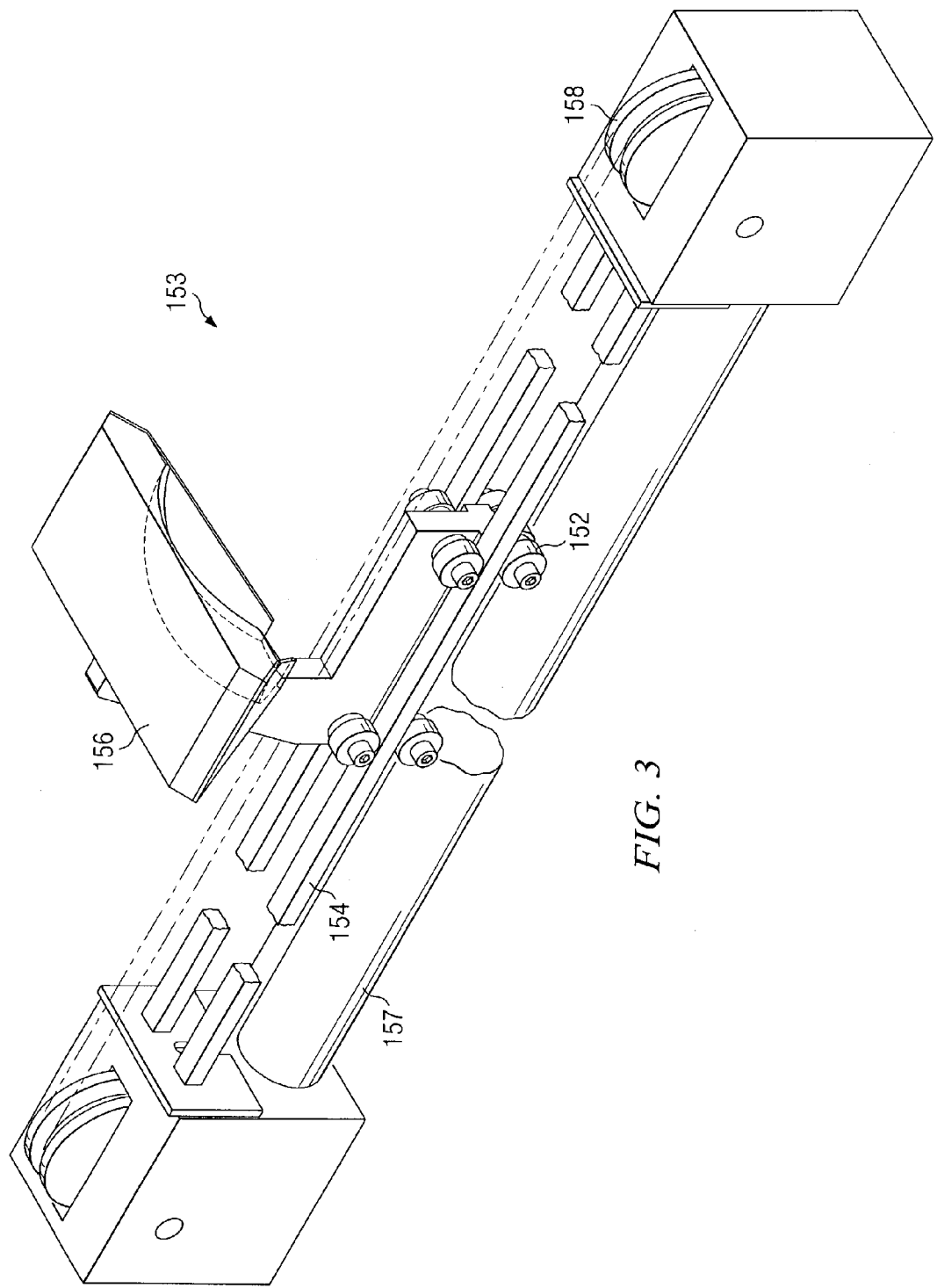
FIG. 3 illustrates a perspective view of a shuttle assembly according to an alternate embodiment of the present invention.

FIG. 3 illustrates a perspective view of a shuttle assembly according to an alternate embodiment of the present invention. As shown in FIG. 3, the shuttle assembly shown generally at 153 includes a plurality of wheels 152 that are formed to guide shuttle assembly 153 along a track 154. A shuttle push shoe 156 is formed to approximately reflect the arrangement of a trough within which a bomb is placed. Accordingly, as shuttle assembly 153 is directed down the stainless steel tracks (track 154), in the alternate embodiment of the present invention, the shuttle push shoe 156 urges the bomb towards a drill bit assembly. A pulley 158 is formed with a "V" groove to engage a steel cable (not show for clarity) attached to shuttle push shoe 156. A pneumatic line cylinder 157 is used to drive the cable and the attached shuttle push shoe forward and rearward to move shuttle push shoe 156 from end to end of the trough of the bomb deactivator.

In the described embodiment of the invention, shuttle push shoe 156 defines an interior concave surface. The concave surface is formed to radially extend in a direction that a bomb is urged or pushed in a manner that results in a portion of the shuttle push shoe partially overlapping a bomb being urged towards a drill bit assembly. As such, the shuttle push shoe assembly provides vertical resistance to help prevent the bomb from moving in a vertical direction as it is being pushed and, more generally, provides stability to keep the bomb axially in place. Further, by utilizing a concave interior surface, the shuttle push can readily achieve the desired result of holding a bomb axially in place for many different sizes of bombs and, more particularly, for many different sizes of pipe bombs with different sized pipe bomb caps. While the described invention includes a concave interior surface, alternate interior surface shapes may be defined. Generally a sloping surface is utilized so as to provide axial and vertical force components (in a downward direction) to keep the bomb firmly against a supporting surface to prevent vertically axial movement. Thus, even a flat planar surface angled to slope and extend over the bomb (at least partially) may be used in alternate embodiments of the invention.

Figure 4A:
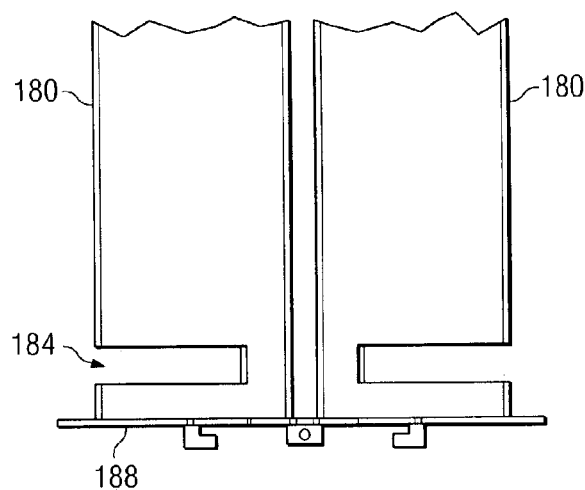
FIGS. 4A, 4B, and 4C are a set of diagrams illustrating a top view, an end view, and a side view, respectively, of a portion of an alternate embodiment of a bomb deactivator trough formed to receive a band saw for cutting the bomb into a plurality of pieces.
Figure 4B:
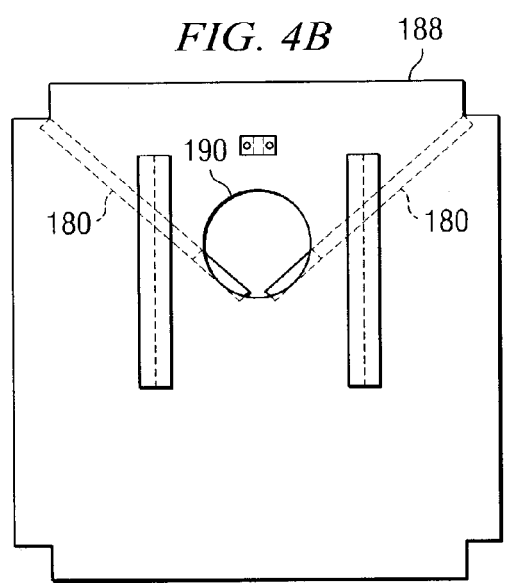
Figure 4C:
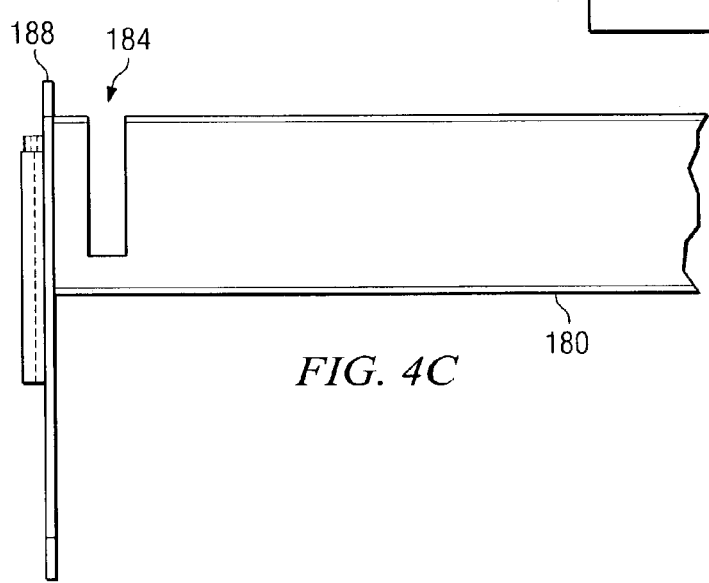

FIGS. 4A, 4B, and 4C are a set of diagrams illustrating a top view, an end view, and a side view, respectively, of a portion of an alternate embodiment of a bomb deactivator trough formed to receive a band saw for cutting a bomb into a plurality of pieces. As may be seen in FIG. 4A, a pair of side panels 180 for holding and supporting a bomb forms a trough. At one end of the trough, side panels 180 define an aperture 184 that is for receiving a band saw blade that is for cutting the bomb into a plurality of pieces. FIG. 4B further illustrates an end view that shows how side panels 180 are placed relative to each other to form a trough. Additionally, a bulkhead 188 is formed with a 3 inch aperture 190 that is for receiving and passing a pipe bomb having a diameter that is less than three inches. FIG. 4C illustrates a side view of the trough mounted to bulkhead 188. As may be seen in FIG. 4C, an aperture 184 is defined. Generally, the depth of aperture 184 is sufficient to slightly exceed a bottom side of a bomb being sawed to allow a band saw to saw completely through the bomb placed on the trough.

Figure 5:
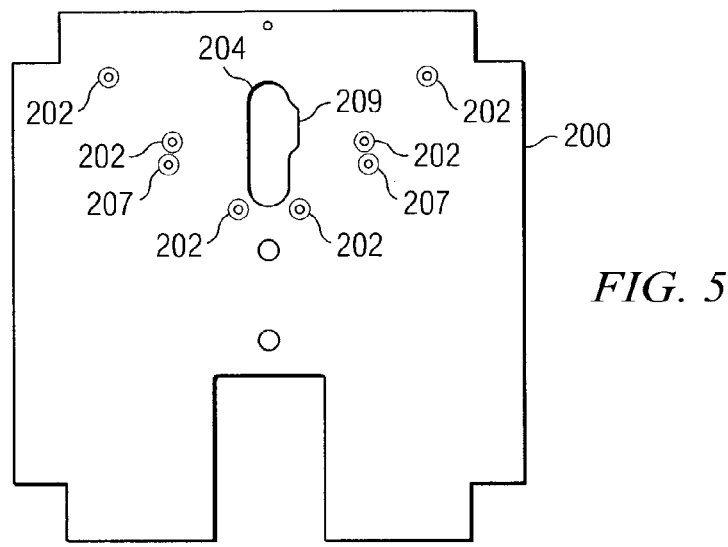
FIG. 5 illustrates an alternate embodiment of a bulkhead of a bomb deactivator formed according to the present invention.

FIG. 5 illustrates an alternate embodiment of a bulkhead of a bomb deactivator formed according to the present invention. As may be seen, in referring to bulkhead 200 of FIG. 5, a plurality of apertures are formed shown generally at 202 for securing side panels forming a trough on the bomb deactivator. Additionally, a vertical slot formed generally at 204 is formed to allow a camera to monitor the drilling process. Apertures 207 are taped to accept adjusting plate locking bolts used to secure an adjustable plate to the bulkhead. As will be described in greater detail below, the drill head assembly is attached to the adjustable plate so that the drill bit may be moved in a vertical direction. Accordingly, bombs of differing diameters may be placed within the trough of the bomb deactivator and the drill bit may be vertically adjusted to penetrate the bomb at its axial center.

Continuing to refer to FIG. 5, bulkhead 200 includes an additional oblong-shaped slot shown generally at 209 is a relief for fluid transfer elbow 314. Aperture 204 is for the drill bit and for providing an opening for a camera to view the drill bit penetrating the bomb cap. By creating oblong-shaped slot 204 as a camera window, in conjunction with slot 212 (which is solely for the camera view), less debris is splashed onto the camera lens thereby improving visibility. In the prior art system, the camera was installed directly above the drill bit wherein there was no shielding to protect the camera lens from spray.

Figure 6:
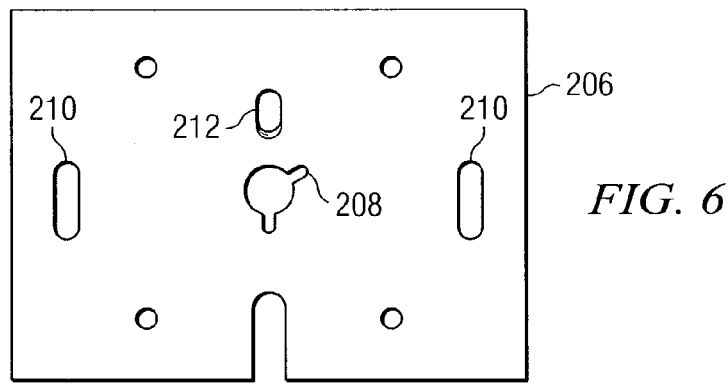
FIG. 6 illustrates an alternate embodiment of an adjustable plate.

FIG. 6 illustrates an alternate embodiment of an adjustable plate. More specifically, adjustable plate 206 of FIG. 6 is formed with aperture 208 that allows for the drill bit with the coupler assembly. As may be seen, a pair of vertical slots, shown generally at 210, is used to enable adjustable plate 206 to be vertically adjusted. Because the drill head assembly is fixedly attached to drill mounting plate 206, vertical movement of adjustable plate 206 is allowed by the vertical slots 210, enabling the drill bit to be vertically adjusted to an approximate center of the bomb.

Figure 7:
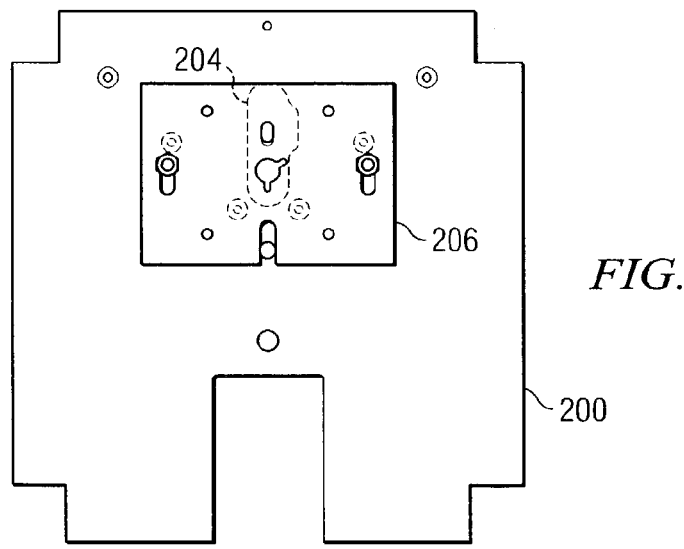
FIG. 7 is an illustration of the bulkhead and adjustable plate attached thereto.

FIG. 7 is an illustration of the bulkhead 200 and adjustable plate 206 attached thereto. A dashed line therein shows the relative placement of vertical slot 204 through which the drill bit may be vertically adjusted.

Figure 8:
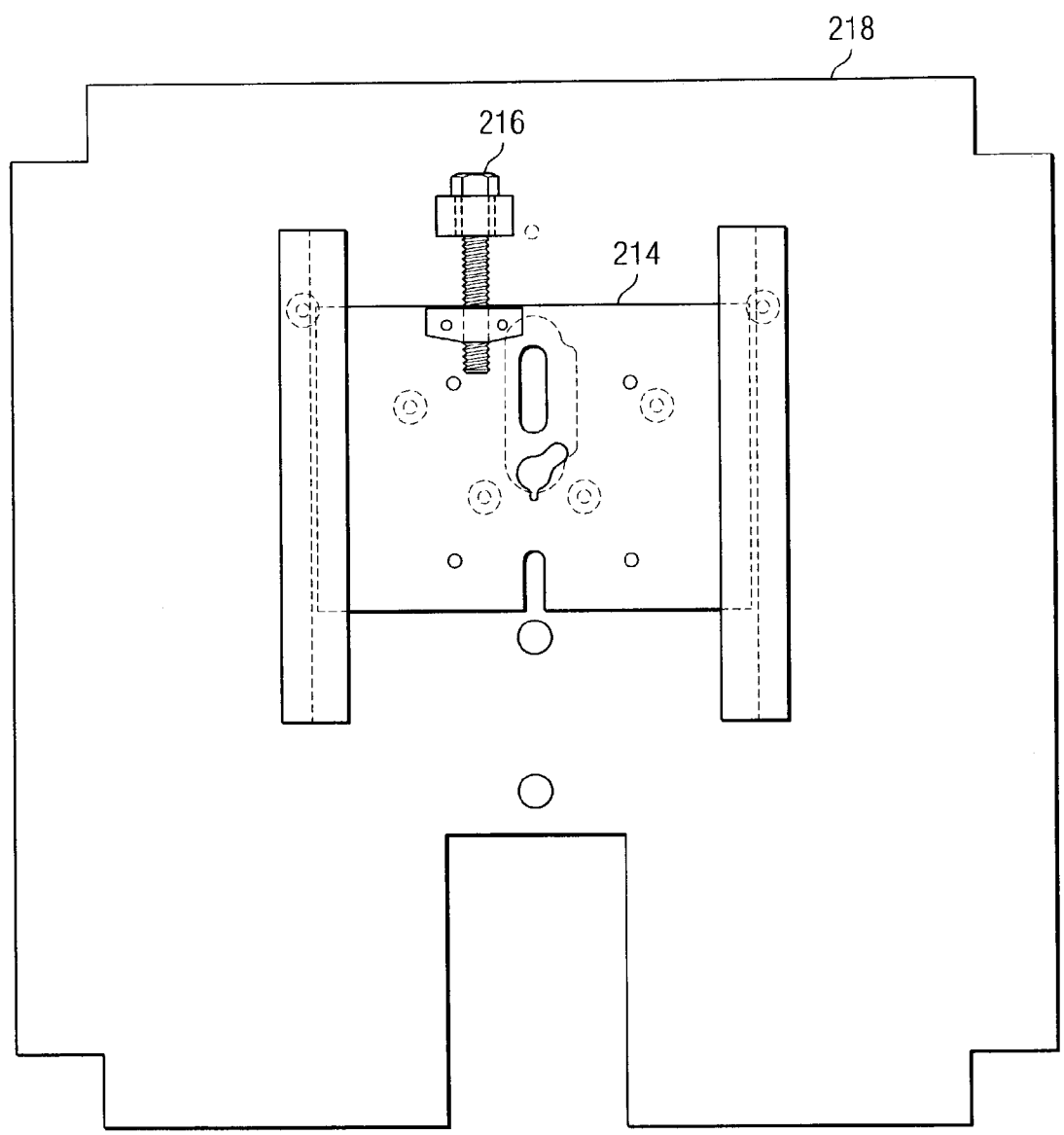
FIG. 8 illustrates one embodiment of a jacking plate attached to the bulkhead.

FIG. 8 illustrates one embodiment of a jacking plate 214, attached to a bulkhead 218. Further, a jackscrew shown generally at 216 is permanently attached to bulkhead 218 and to jacking plate 214. Accordingly, the jacking plate 214, and therefore the drill head assembly, may be vertically adjusted merely by rotating jackscrew 216.

Figure 9:
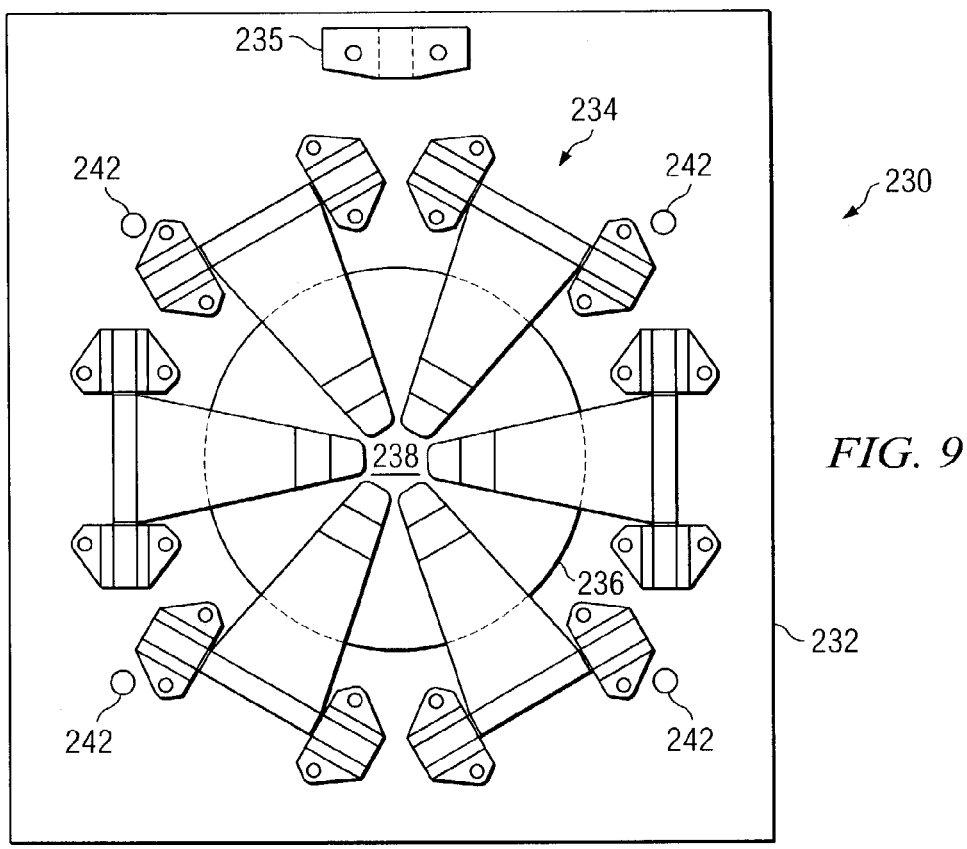
FIG. 9 is a diagram illustrating a front view of a fingered aperture assembly formed according to one embodiment of the present invention.

FIG. 9 is a diagram illustrating a front view of a fingered aperture assembly formed according to one embodiment of the present invention. Fingered aperture assembly, shown generally at 230, comprises fingered aperture jacking plate 232 and a plurality of springed fingers 234 to securely hold a bomb in place. The plurality of springed fingers 234 cover a radial opening 236 that is seen by the dashed and solid lines shown here in FIG. 9. Without a bomb present, the plurality of springed fingers 234 remain in a substantially planer configuration, minimizing the size of a passageway shown at 238. As a bomb is urged through radial opening 236 and, more specifically, opening 238, the plurality of springed fingers 234 give way and will rotate in an outward direction. Thus, passageway 238 is enlarged to match a required opening size to pass the bomb as it is urged there through. Finally, a plurality of apertures, for example apertures 242, formed within fingered aperture jacking plate 232, is for mounting fingered aperture assembly 230 to a drill head assembly. A captured nut 235 is for receiving the jacking screw.

Figure 10A:
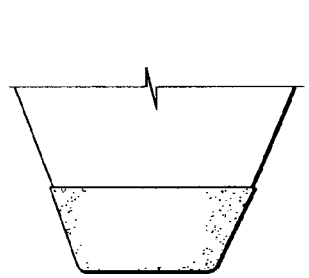
FIGS. 10A, 10B, 10C, and 10D are illustrations of several embodiments of a beveled tip.
Figure 10B:
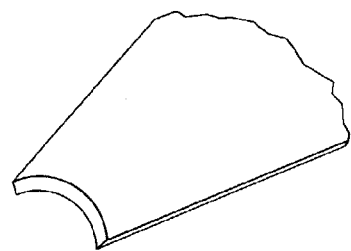
Figure 10C:
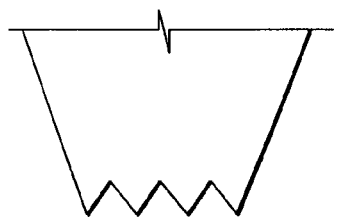
Figure 10D:
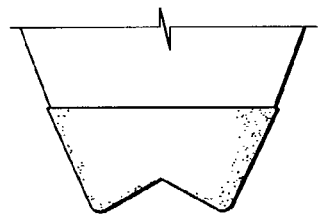

FIGS. 10A, 10B, 10C, and 10D are illustrations of several embodiments of a beveled tip. The beveled tips are formed on the end of the springed fingers of the fingered aperture assembly of FIG. 9. The beveled tips in FIGS. 10A and 10D illustrate beveled tips coated with a material, copper in one embodiment, to prevent sparking. In alternate embodiments, the beveled tips would be coated in a non-metallic material such as rubber. The beveled tip in FIG. 10C illustrates another embodiment in which the beveled tip is serrated to lightly penetrate the bomb thereby securely holding the bomb during deactivation. The beveled tip in FIG. 10B shows an alternate embodiment in which the beveled tip is concave on the tip and in a longitudinal direction. The concave configuration allows the beveled tip to conform to the contour of the bomb. As can be appreciated by one of average skill in the art, each embodiment of FIGS. 10A–10D could be formed in a concave configuration.

Figure 11:
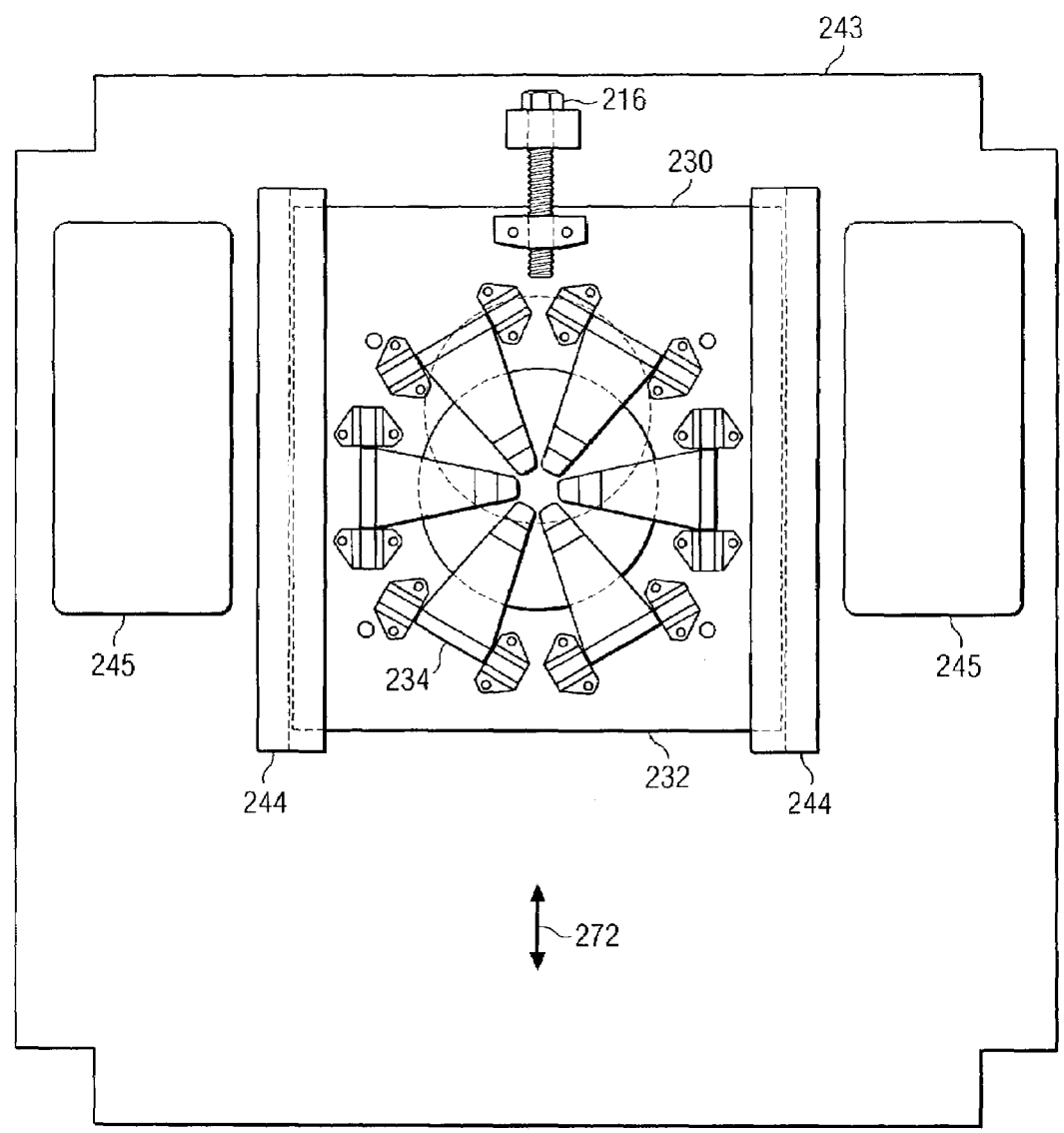
FIG. 11 is an illustration of the fingered aperture assembly connected to a jackscrew and to the bulkhead.

FIG. 11 is an illustration of fingered aperture assembly 230 connected to jackscrew 216 and to bulkhead 243 to allow the fingered aperture assembly to be moved axially in the directions indicated at 272. More specifically, fingered aperture assembly 230 is shown to be mounted on fingered aperture jacking plate 232 that facilitates the vertical movement in the directions shown at 272 by rotating jackscrew 216. A pair of side support rails 244 securely holds the fingered aperture jacking plate 232 to bulkhead 243 thereby allowing movement only in the directions shown at 272. Apertures 245 are formed in bulkhead 243 for accepting band saw 408 and allowing the vertical movement of band saw 408 during a bomb cutting operation.

Figure 12:
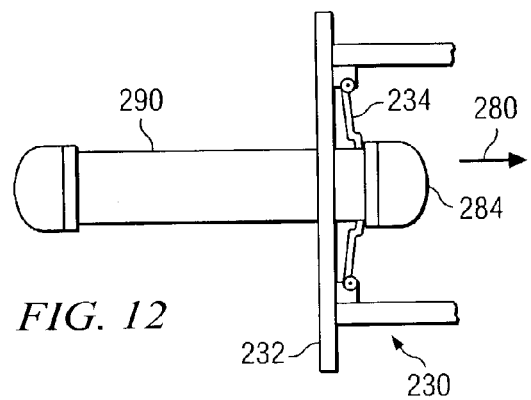
FIG. 12 is a cutaway side view illustrating a bomb being held securely in place by the fingered aperture assembly.

FIG. 12 is a cutaway side view illustrating a bomb being held securely in place by the fingered aperture assembly of FIG. 11. As may be seen, a bomb, here bomb 290, has been axially urged in a direction 280 through the fingered aperture assembly shown generally at 230. Bomb 290 has passed through a radial opening (not shown) formed within fingered aperture jacking plate 232 and through the plurality of springed fingers 234 which have rotated in a radial direction shown at 280. As may be seen, once a larger diameter cap 284 of the pipe bomb shown here in FIG. 12, namely, bomb 290, has passed through and beyond the plurality of springed fingers 234, the plurality of springed fingers 234 will be urged back to as much of a normal enclosed position as possible. Accordingly, if one were to urge bomb 290 in a direction opposite to 280, the plurality of springed fingers would engage the cap of bomb 290 to prevent any movement in a direction opposite to 280 once the cap comes back into contact with the outer edges of the plurality of springed fingers 234. Accordingly, as the drill head assembly (not shown here in FIG. 12), provides axial pressure in a direction opposite to direction 280 as it commences to drill, bomb 290 will remain securely in place to offer necessary resistance for the drill bit to cut through the cap of bomb 290.

Figure 13:
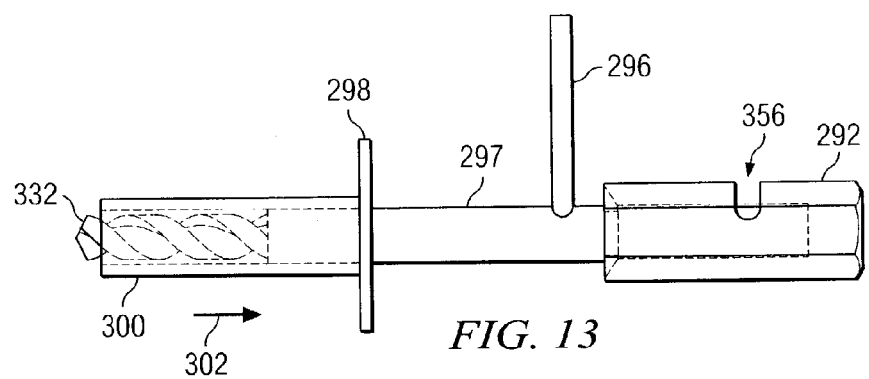
FIG. 13 illustrates one embodiment of a drill bit assembly of the present invention.

FIG. 13 illustrates one embodiment of a drill bit assembly of the present invention. Referring now to FIG. 13, the drill bit assembly shown therein includes a ¼" hex drill bit drive formed of ¼" hex stock 292. The ¼" hex stock 292 has been drilled to receive a drill bit 332, wherein drill bit 332 is welded into ¼" hex stock 292 by way of a machined aperture 356. In the preferred embodiment of the invention, drill bit 332 may be secured to ¼" hex stock 292 in any known manner, including welding, as is known by those of average skill in the art. By using ¼" hex stock, the drill bit may be readily inserted into a ¼" tool bit holder in place of a keyless drill chuck. The ¼" hex stock, therefore, may be inserted directly into a customized ¼" bit holder assembly that is part of the gear drive of the motor assembly. A drill fluid supply tube shown generally at 296 is permanently attached to a concave machine aperture formed in a drill fluid transfer tube 297 in a fashion to form a good mechanical seal. Those of average skill in the art can readily appreciate the various manufacturing techniques for attaching the drill fluid supply tube to the drill fluid transfer tube.

The drill bit assembly of FIG. 13 further includes a drill depth sensor ring shown generally at 298. The drill depth sensor ring includes an outer sleeve 300 forming a passageway through which drill bit 332 and drill fluid transfer tube 297 may be axially conducted. Accordingly, as the drill bit penetrates a bomb, outer sleeve 300 and drill depth sensor ring 298 are axially directed towards a rearward direction shown generally at 302 until a micro-switch (not shown) is reached thereby switching to a next step in the process for rendering a bomb inert. Though described in relation to a bomb deactivator, the drill bit assembly is applicable to any application that requires control of a fluid for cutting or cooling or both.

Figure 14:
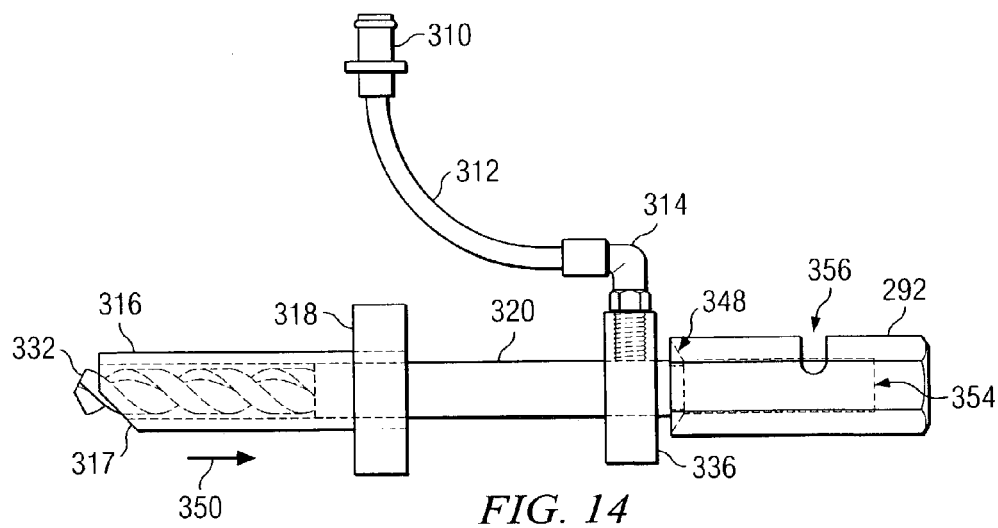
FIG. 14 illustrates one embodiment of a drill bit assembly formed according to one embodiment of the present invention.

FIG. 14 illustrates one embodiment of a drill bit assembly formed according to one embodiment of the present invention. As may be seen from referring to FIG. 14, a quick coupler connector 310 is attached to a flexible tube shown generally at 312 that, in turn, is attached to an elbow connector 314. Fluid conduction tube 320 is inserted into a solid steel sleeve 336 and permanently secured in place with one of epoxy or super glue. Solid steel sleeve 336, along with fluid conduction tube 320, are bored through and threaded to accept elbow connector 314, wherein fluid conduction tube 320 is then bored to inside diameter of fluid conduction tube 320 to cut elbow connector 314 (including excess threads) flush with the inside diameter of fluid conduction tube 320 to create a flush inner surface.

A telescoping outer tube shown generally at 316 includes a collar assembly 318 that functions as the drill depth sensor ring. The telescoping outer tube 316 slides axially about drill bit 332 and fluid conduction tube 320. When collar assembly 318 slides axially in a direction shown generally as 350, it will actuate a drill depth micro-switch (not shown) to generate control signals to initiate a next process step. Telescoping outer tube 316 directs fluid against the bomb at the drill point to more effectively prevent sparking and inject fluid into the drilled bomb and also facilitates more efficient cooling. Telescoping outer tube 316 is further formed with a 45 degree cut, shown generally at 317. The 45 degree cut 317 flushes cutting debris away from the drill bit thereby substantially reducing clogging of fluid conduction tube 320. Once a drill bit is fully penetrated in a bomb or bomb cap, fluid conduction tube 320 abuts against the bomb or bomb cap to form a mechanical seal in the described embodiment. Thus, the conduction tube 320 is sized sufficiently long in relation to the drill bit and telescoping outer tube 316 to achieve this effect.

Additionally, ¼" hex stock is shown at 292 into which drill bit 332 is permanently installed into machined aperture 354 and welded by way of aperture 356. As the drill bit penetrates the bomb, the axially-directed telescoping outer tube 316 is urged in a direction shown at 350 relative to the drill head assembly. In the described embodiment of the invention, the entire drill bit motor assembly and drill bit assembly are urged axially by a pneumatic cylinder in a direction opposite 350. Finally, fluid conduction tube 320 is formed to mate with an internal flange 348 machined into ¼" hex stock 292 to prevent the need for a fender washer or any sealing design.

Figure 15A:
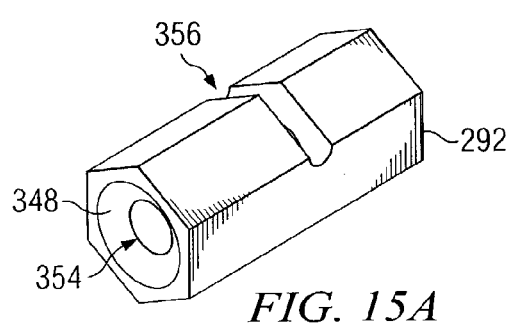
FIGS. 15A and 15B are a perspective view and a side view, respectively, of ¼" hex stock.
Figure 15B:
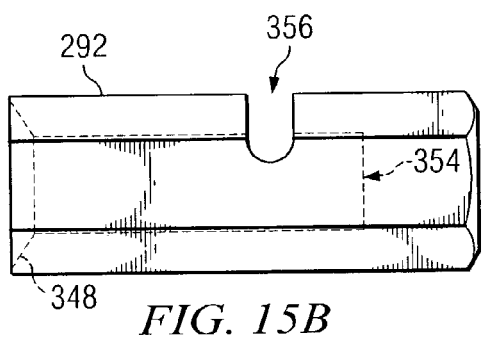

FIGS. 15A and 15B are a perspective view and a side view, respectively, of ¼" hex stock 292. The ¼" hex stock 292 has a machined internal flange 348 formed to matingly seal with fluid conduction tube 320 of FIG. 14, thereby preventing the need for any other sealing design. The ¼" hex stock 292 is further formed with an aperture 354 to accept drill bit 332 (not shown) and aperture 356 for the permanent mounting of drill bit 332 to ¼" hex stock 292.

Figure 16A:
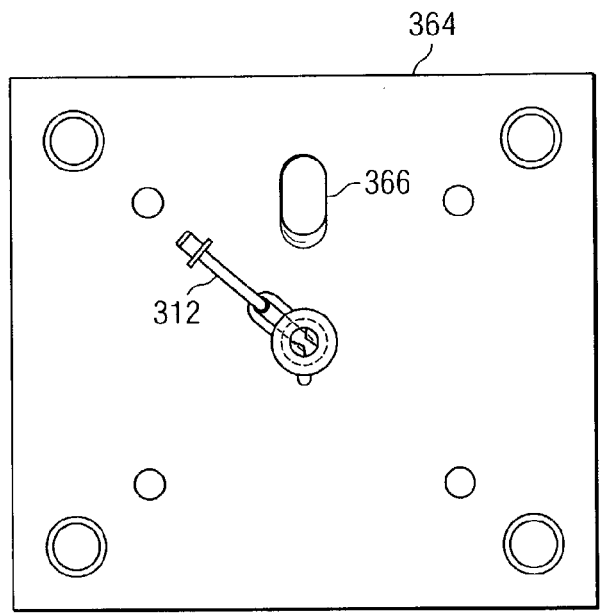
FIGS. 16A and 16B are a set of diagrams illustrating a front view of a drill head assembly and of a side view of the drill head assembly installed in a forward drill bit head assembly plate.
Figure 16B:
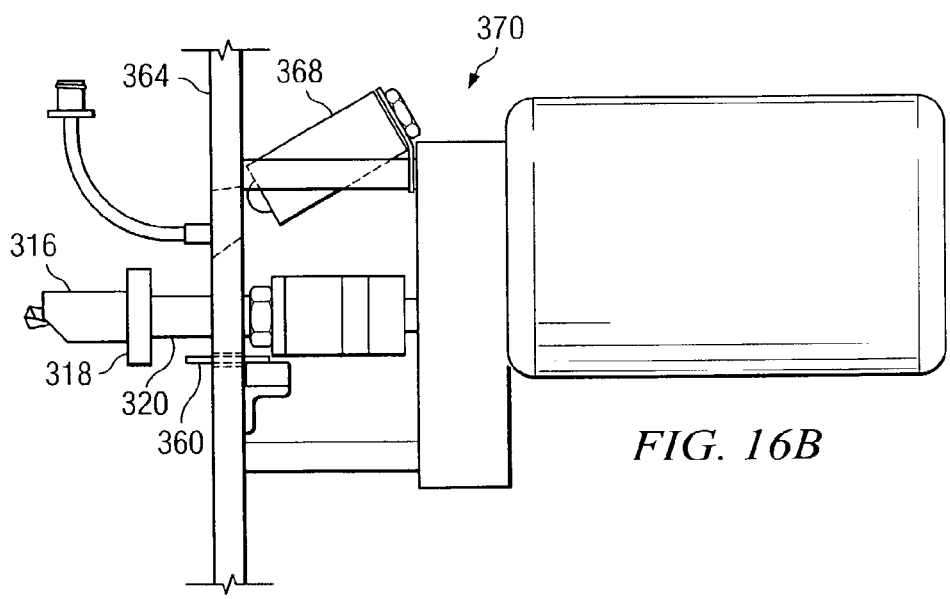

FIGS. 16A and 16B are a set of diagrams illustrating a front view of a drill head assembly (16A) and of a side view of the drill head assembly (16B) installed in a forward drill bit head assembly plate 364. Telescoping outer tube 316 is formed to telescope along and about fluid conduction tube 320. Telescoping outer tube 316 includes collar assembly 318 that is for engaging with a drill head depth micro-switch arm 360. Accordingly, as drill head assembly 370 (partially shown here) is urged towards the bomb and as the drill penetrates the bomb, collar assembly 318 and telescoping outer tube 316 are urged, relative to the drill bit, towards micro-switch arm 360. Once micro-switch arm 360 is sufficiently engaged, the drill depth micro-switch closes thereby generating a signal to prompt a control system to alter fluid pump speed and drill bit motor speed (doubling pumping pressure to increase pressure and volume and halt or slow the drill motor to either stop or slow the drill bit according to the embodiment). Additionally, aperture 366 (of FIG. 16A) is formed in forward drill bit head assembly plate 364 to enable photography of the drilling activity by a camera 368 of FIG. 16B. Thus, as the drill head assembly 370 is urged toward the bomb, camera 368 may provide video thereof to facilitate control of the drilling operation.

FIGS. 17A and 17B illustrate a front view and a side view, respectively, of forward drill bit head assembly plate 364 with the drill depth micro-switch installed thereon according to one embodiment of the present invention. As may be seen, a micro-switch arm 360 of the drill depth micro-switch, shown generally at 372, may be seen extending through drill access aperture 374 formed in forward drill bit head assembly plate 364 in order to contact collar assembly (collar assembly 318 of FIG. 16B) as it slides axially. The forward drill head mounting plate is formed with a notch, shown generally at 376, formed on drill access aperture 374 for receiving and holding elbow connector 314 and flexible tube 312 (of FIG. 14) steady and to keep it from rotating with the drill bit.

FIG. 18 is a side cutaway view of one embodiment of the present invention. Referring to the bomb deactivator shown generally at 400, the self-contained unit includes a linear actuator assembly 150, including push shoe assembly, shown generally at 418 for urging bomb 164 towards a drill head assembly shown generally at 166. Many of the elements of the system shown in FIG. 18 are similar to that which has been described before. However, some of the differences include a band saw shown generally at 408 that pivots about a pivot point shown generally at 410. Additionally, a drill head assembly 166 is coupled to a plurality of rails, shown at 414, to enable the drill head assembly 166 to move axially when urged in an axial direction by a pneumatic cylinder shown generally at 416. Accordingly, linear actuator assembly 150 urges bomb 164 in a direction shown at 420, drill head assembly 166 may be moved axially in a direction shown at 421, which is generally opposite to direction 420. As will be described in greater detail, bomb 164 is urged by linear actuator assembly 150 into a vertical transition block and locking block, which securely grips bomb 164. The operation of vertical transition block and the locking block will be described in the following figures. Once bomb 164 is within the locking block, drill bead assembly 166 is urged in the axial direction 421 by pneumatic cylinder 416. Finally, as will also be explained in more detail later, band saw 408, after the bomb is rendered inert, may be moved in an arc, though substantially vertical, direction as band saw 408 pivots about a pivot point shown generally at 410, to cut the bomb into a plurality of pieces to provide verification that the bomb has been rendered inert.

FIG. 19 illustrates a linear actuator assembly, shown generally at 150, according to one embodiment of the present invention. The linear actuator assembly comprises a push shoe assembly shown generally at 418, a linear lead screw 422, a drive motor assembly 424, and a support bearing assembly 426. In operation, push shoe assembly 418, comprising lower bracket 421 and push shoe 423, advances toward the drill head assembly in a direction 420 or retracts to the start position in a direction 421 according to operation of linear lead screw 422. A control signal sent to drive motor assembly 424 turns linear lead screw 422 clockwise to retract push shoe assembly 418 or counter-clockwise to advance push shoe assembly 418. Support bearing assembly 426 supports linear lead screw 422 at the first bulkhead (not shown). FIG. 20 is a partial side cutaway view of the present invention. As linear actuator assembly (linear actuator assembly 150 of FIG. 19) urges the bomb (bomb 164 of FIG. 18) toward drill head assembly shown generally at 166, the bomb encounters vertical transition block 430. Vertical transition block 430 comprises a ramp portion 432 and a level portion 434. Urged forward by the linear actuator assembly, the bomb will travel up ramp portion 432 until it reaches level portion 434 and passes through apertures formed in locking plate 436 and jacking plate 438. When the bomb cap passes the end of vertical transition block 430, the bomb drops such that the body of the bomb lies on level portion 434. Locking plate 436 moves to hold the bomb securely while jacking plate 438 is adjusted to position the drill bit to the approximate center of the bomb cap. Operation of locking plate 436 and jacking plate 438 will be discussed in the following figures.

A compartment 437, filled with disposable absorbent material, is positioned under the drill head assembly to absorb excess drilling fluid and to catch any material and charge that are removed during the drilling process. The absorbent material is later removed so forensic test can be performed on the removed material and charge.

FIGS. 21A and 21B illustrate a top view and a left side view, respectively, of the trough, bulkheads, and a vertical transition block according to one embodiment of the present invention. Trough panels 440 are attached to a first bulkhead 442 in a manner that provides a space between the trough panels, shown generally at 444, for passage of push shoe 423 of FIG. 19. Vertical transition block, shown generally at 430, comprises ramp portion 432 and level portion 434. Additionally, an aperture 446 is formed to allow a band saw blade to pass completely through the bomb thereby confirming the inerting process. Guide rails 448 are attached to a second bulkhead 450 to hold the locking plate (not shown) and the jack plate (not shown) against the first bulkhead.

Figure 22:
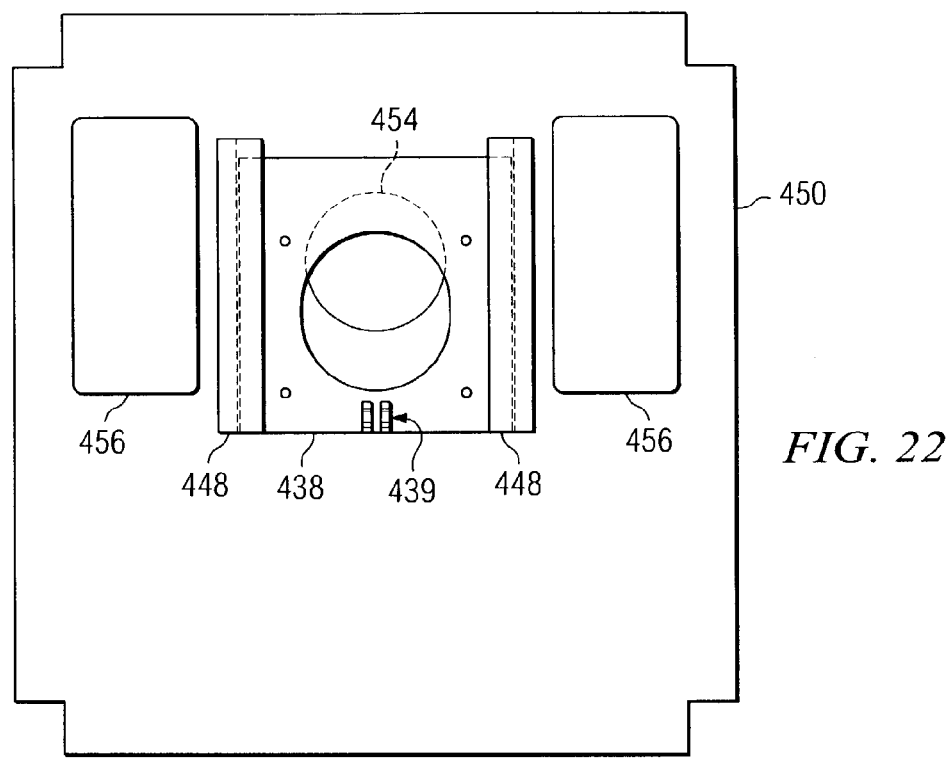
FIG. 22 illustrates a jacking plate assembly according to one embodiment of the present invention.

FIG. 22 illustrates a jacking plate assembly according to one embodiment of the present invention. Jacking plate 438 and guide rails 448 are shown attached to second bulkhead 450. Jacking plate 438 is raised and lowered to position the drill head assembly to the approximate center of the bomb cap. Jacking plate 438 is shown in a lowest position, having been moved from a highest position illustrated by dashed line 454. Dashed line 454 also indicates the three inch aperture that the bomb passes through. Cutouts 456 are formed in second bulkhead 450 to allow the band saw to rotate downward during the sawing operation. A jacking plate lift actuator 474 of FIG. 28 attaches to jacking plate 438 by way of attachment 439.

Figure 23:
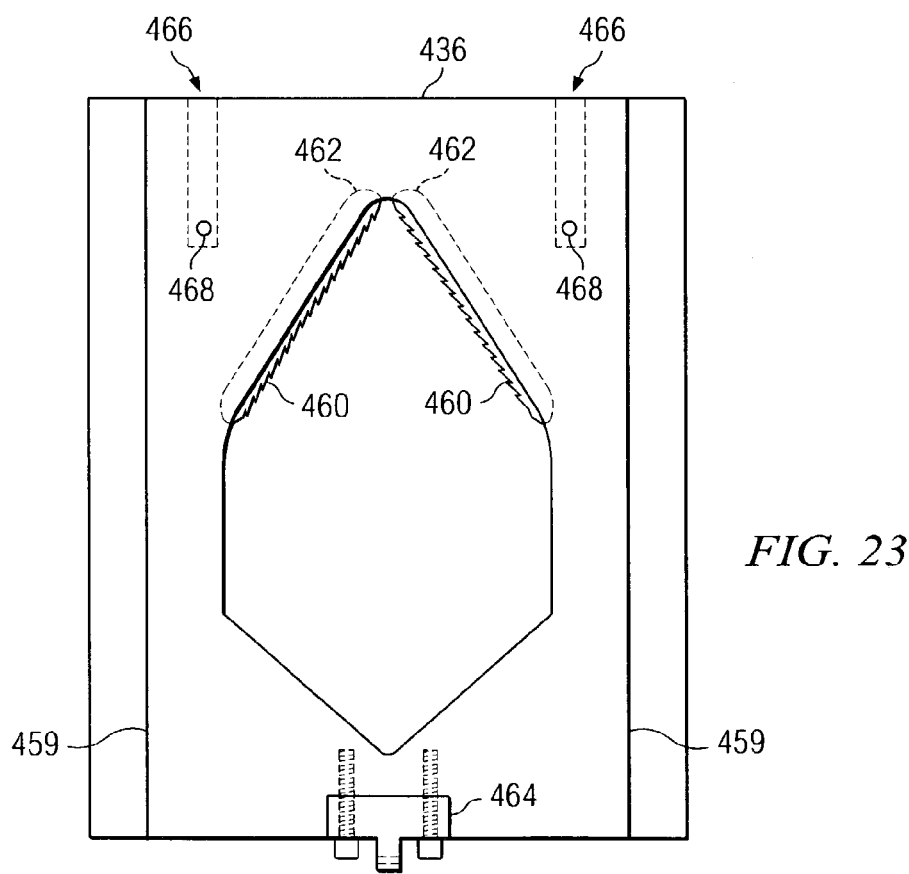
FIG. 23 illustrates a locking plate according to one embodiment of the present invention.

FIG. 23 illustrates a locking plate according to one embodiment of the present invention. As shown in FIG. 23, high speed steel grippers 460 are removably attached to locking plate 436 by way of relief cutouts shown generally at 462. The teeth of high speed steel grippers 460 are oriented to resist the tendency of the bomb to rotate in a clockwise motion with the torque of the drill bit.

As will be described with reference to FIG. 24, movement of locking plate 436 is controlled by a chain and return springs. The chain drive attaches to a pulling block 464 by way of a chain master link. The return springs are installed in apertures 466 drilled vertically into locking plate 436. The return springs are held in place with locking pins (not shown) inserted into apertures 468. Locking plate 436 is further formed with a step cut 459 on each side of locking plate 436, said step cuts for mating with guide rails (guide rails 448 of FIG. 25).

Figure 24:
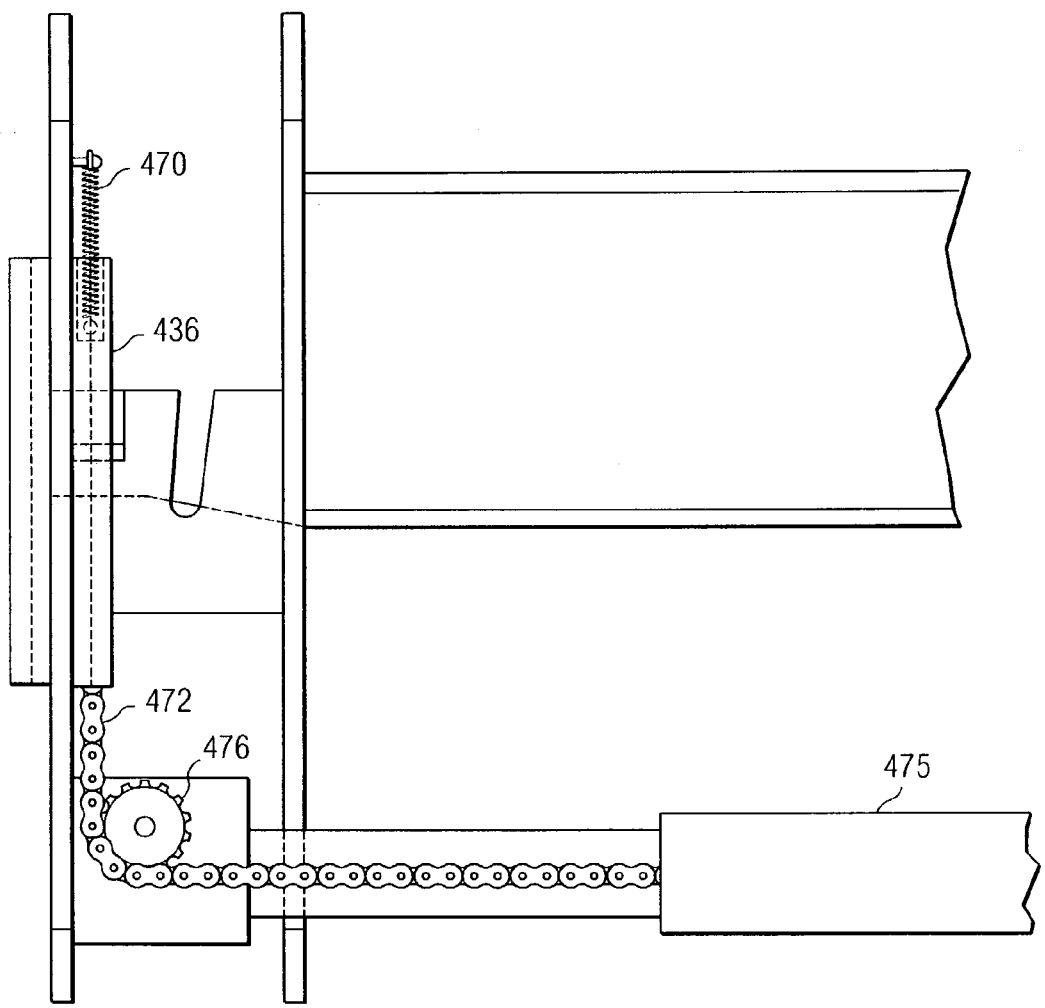
FIG. 24 is a partial left side view of the present invention illustrating a locking plate operation.

FIG. 24 is a partial left side view of the present invention illustrating locking plate operation. Locking plate 436 is shown attached to return springs 470 and chain 472. A pneumatic cylinder inside a pull down actuator 475 pulls chain 472 across sprocket 476 which causes a downward force on locking plate 436, thereby firmly securing the bomb against the transition block. Once the bomb has been cut into at lease two pieces, pull down actuator 475 will release chain 472 wherein return springs 470 pull locking plate 436 to the highest position.

Figure 25:
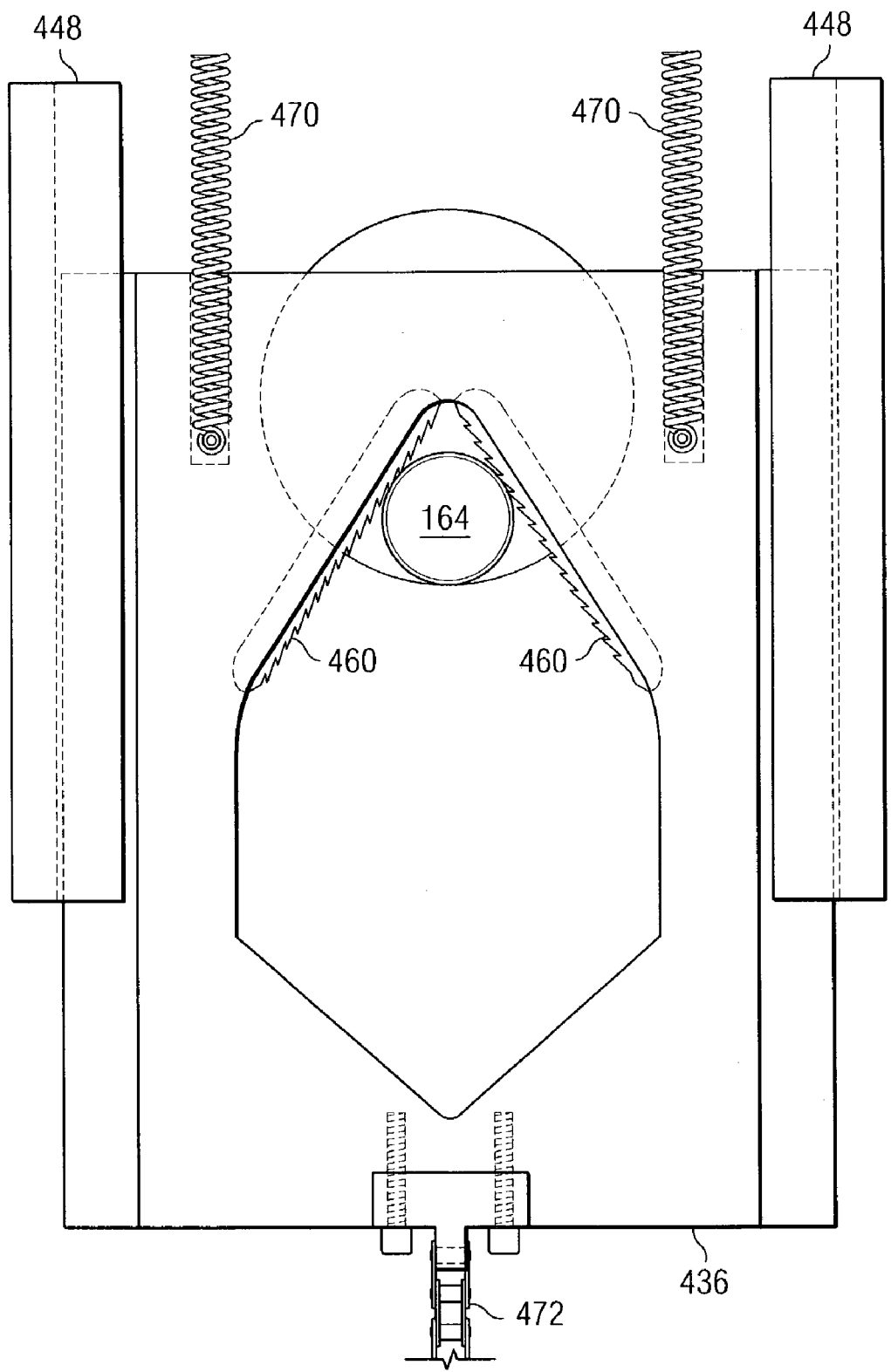
FIG. 25 illustrates the locking plate according to the present invention.

FIG. 25 illustrates the locking plate according to the present invention. Locking plate 436 is shown pulled down to engage bomb 164 thereby holding it securely against the level portion of vertical transition block (not visible in this view). As shown in FIG. 25, high speed steel grippers 460 are in contact with bomb 164 to substantially reduce rotation of the bomb due to the torque generated by the drill bit. Return springs 470 are stretched by the downward force applied to locking plate 436 by pull down actuator (pull down actuator 475 of FIG. 24). Return springs 470 will return locking plate 436 to the highest position when the bomb has been cut into at least two pieces to verify the inerting process. Thereafter, locking plate 436 is released by the pull down actuator. Guide rails 448 maintain locking plate 436 in a substantially perpendicular position.

Figure 26:
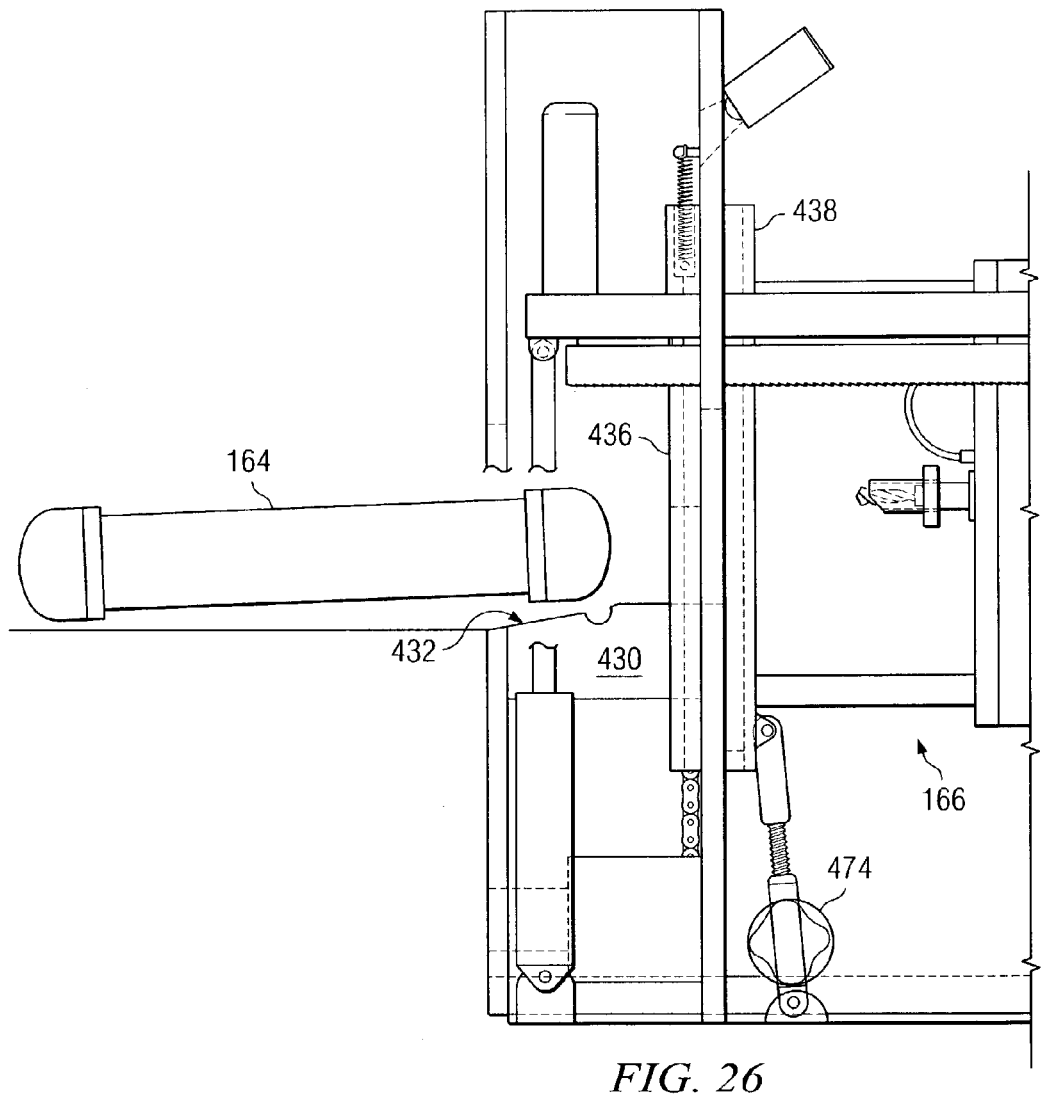
FIG. 26 illustrates the bomb being urged up the ramp portion of the transition block.

FIG. 26 illustrates the bomb being urged up the ramp portion of the transition block. During this phase of bomb deactivation, locking plate 436 and jacking plate 438 remain in their starting positions as bomb 164 moves up ramp portion 432 of vertical transition block 430. A jack plate lift actuator 474 is shown attached to jacking plate 438. Once bomb 164 is resting on the level portion of vertical transition block 430 and held securely by locking plate 436, jacking plate lift actuator 474 will adjust the vertical position of jacking plate 438 and, consequently, the vertical position of the drill head assembly to adjust the drill bit of drill head assembly 166 to the approximate center of the bomb cap for the drilling operation.

Figure 27:
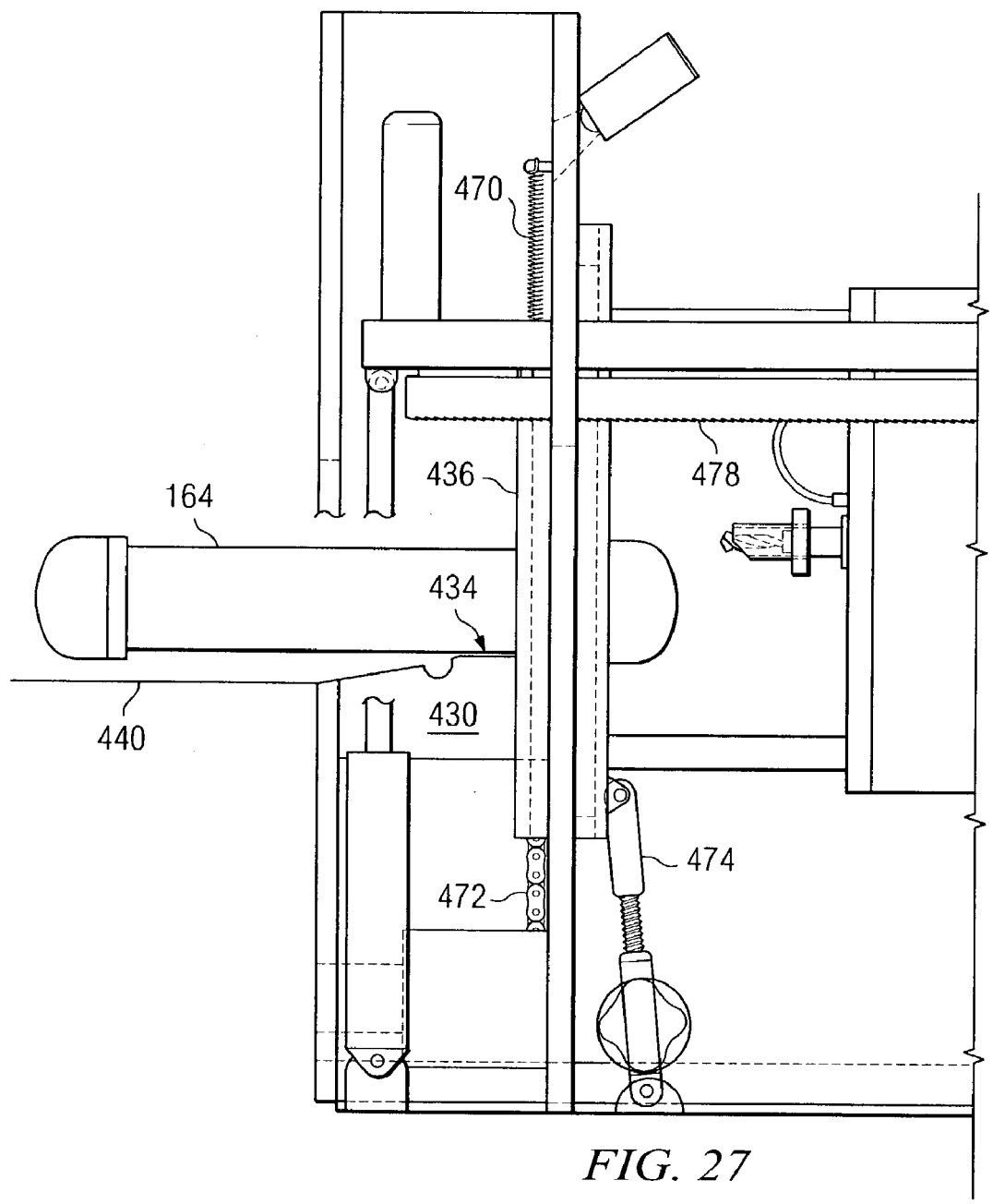
FIG. 27 illustrates the bomb on the level portion of the transition block.

FIG. 27 illustrates the bomb on a level portion of the transition block. In this step of the bomb deactivation process, bomb 164 has moved up vertical transition block 430 until the bomb cap passes the end of vertical transition block 430 and drops down so that the body of bomb 164 is resting on the on the level portion, shown generally at 434, of vertical transition block 430. Locking plate 436 has been pulled down to securely hold bomb 164 against vertical transition block 430. As can be seen in FIG. 27, the end of bomb 164 is elevated from trough panel 440 due to the level portion of vertical transition block 430 being higher than bottom of trough panel 440. This elevation allows the end of bomb 164 to drop slightly as band saw blade 478 cuts through bomb 164 thereby preventing band saw blade 478 from binding during the cutting operation.

Figure 28:
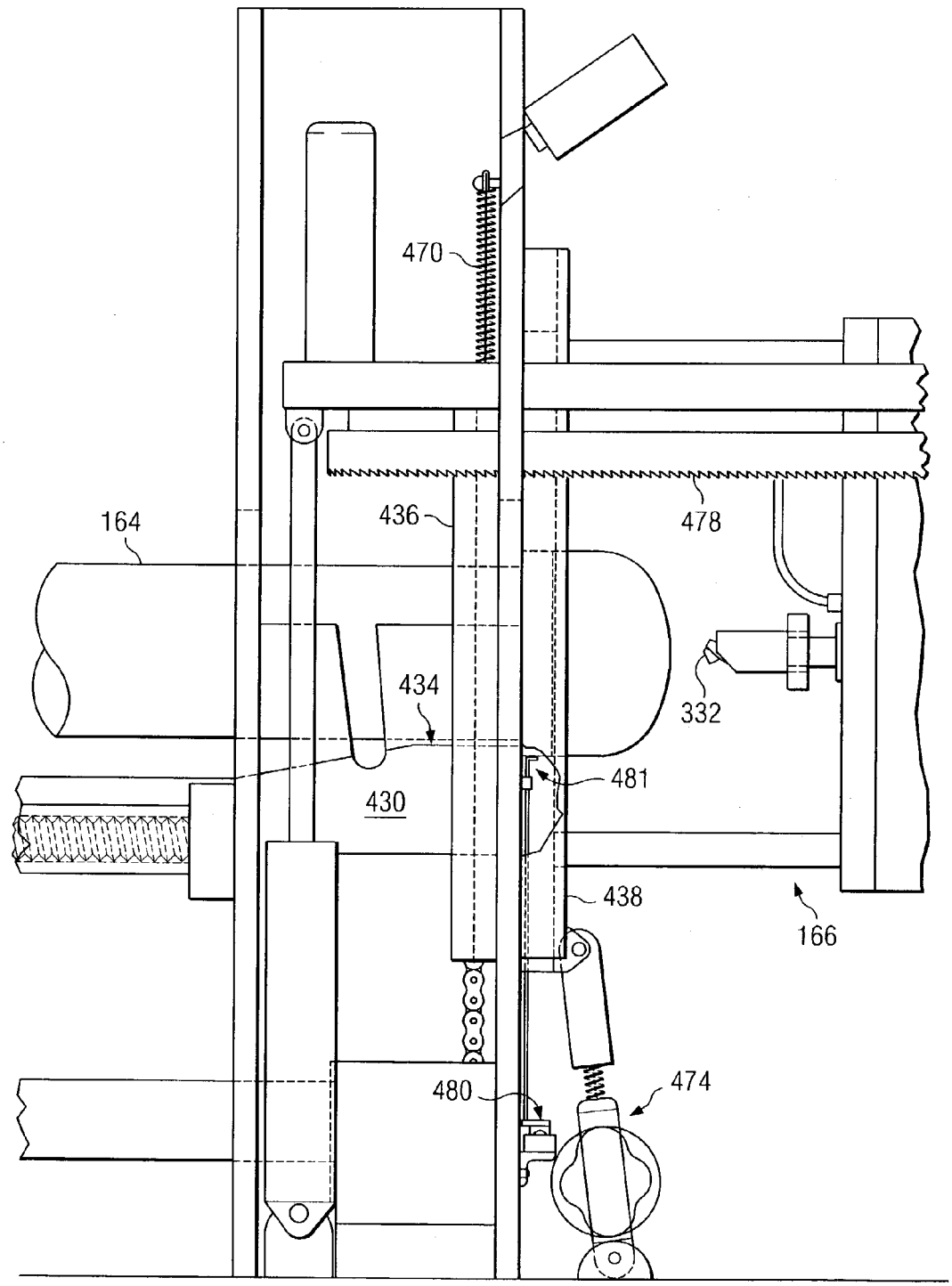
FIG. 28 is a partial cross section view of the present invention.

FIG. 28 is a partial cross section view of the present invention. Bomb 164 is shown resting on level portion 434 of vertical transition block 430. When the bomb cap of bomb 164 passes the end of vertical transition block 430 and through the three inch aperture 450 and generally across both bulkheads and the vertical transition block, it drops down allowing the body of the bomb to lay flat on vertical transition block 430 level portion 434. In doing so, the bomb cap engages an arm 481 of linear actuator micro-switch 480. Linear actuator micro-switch 480 generates a signal that triggers linear actuator assembly (linear actuator assembly 150 of FIG. 18) to return the linear actuator assembly 150, including the push shoe (push shoe 423 of FIG. 19) to the start position. At this step in the bomb deactivation process, locking plate 436 has secured the bomb, jacking plate lift actuator assembly 474 has adjusted the drill head assembly 166 so drill bit 332 is positioned to the approximate center of the bomb cap and the drill head assembly is ready to drill into the bomb cap.

Figure 29:
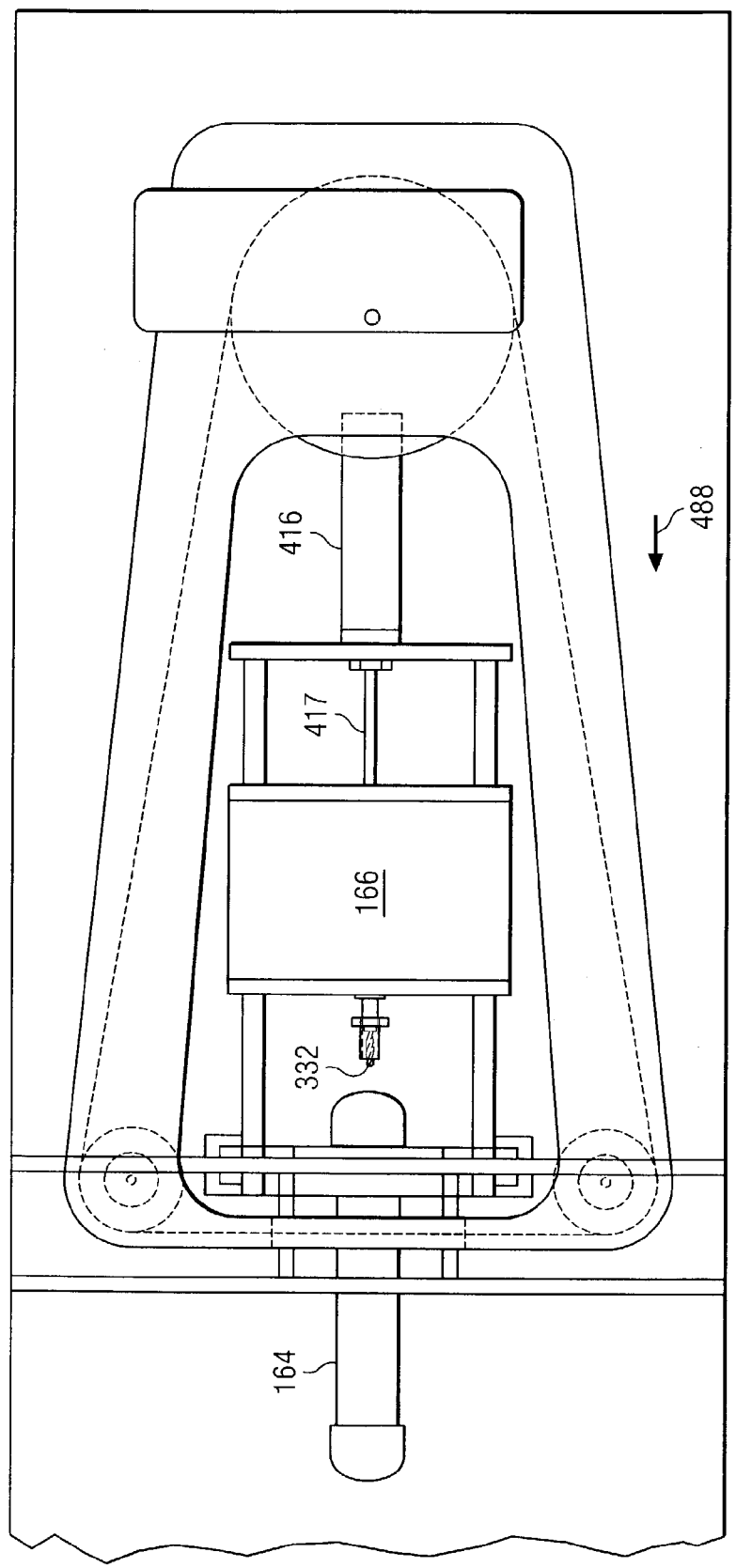
FIG. 29 illustrates a top view of the bomb, drill head assembly, and the band saw.

FIG. 29 illustrates a top view of the bomb, drill head assembly, and the band saw. At this step in the deactivation process, drill head assembly 166 is adjusted vertically to the approximate center of bomb and pneumatic cylinder 416 is urging drill head assembly 166, by way of piston 417, toward bomb 164 in a direction 488.

Figure 30:
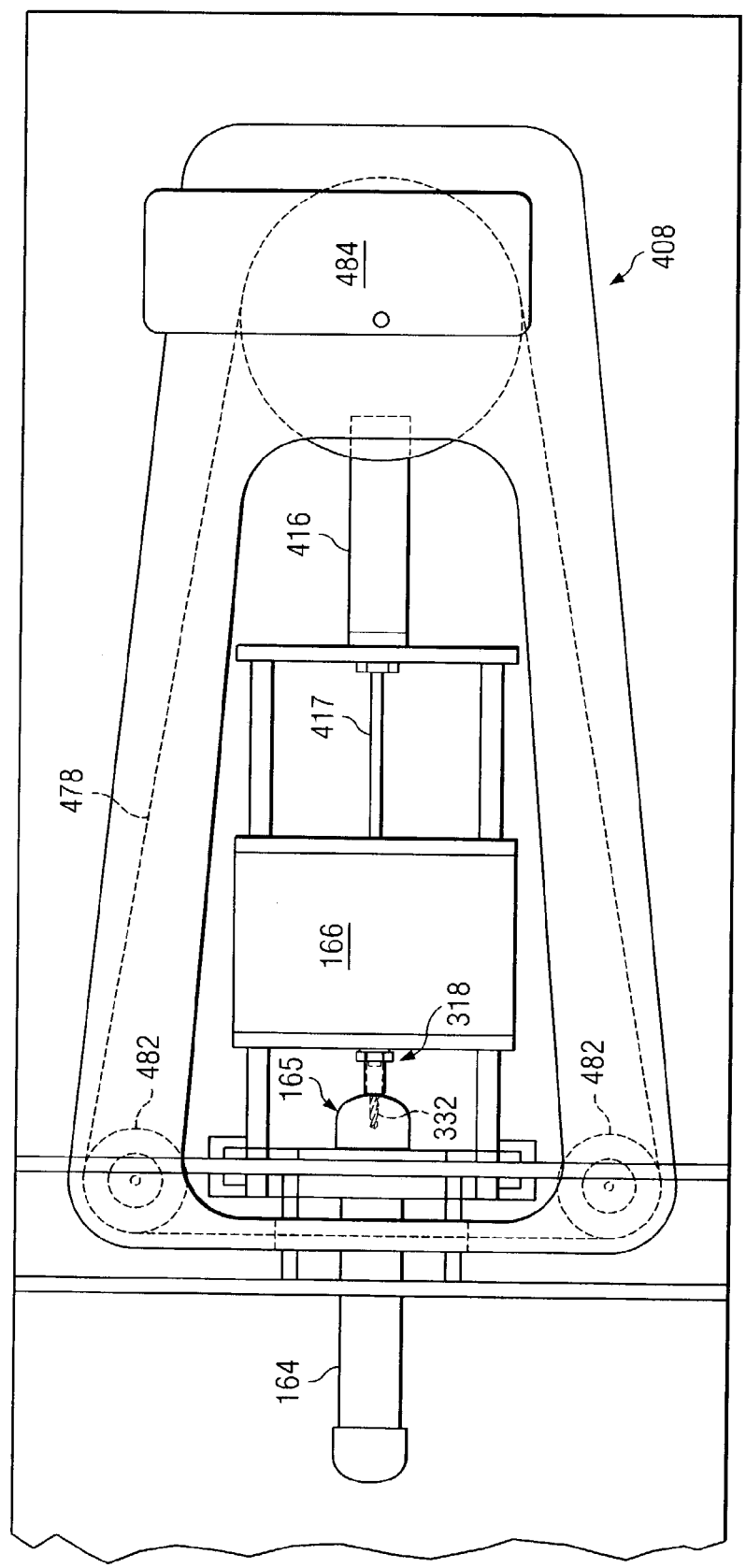
FIG. 30 illustrates a top view of the drill bit fully penetrating the bomb.

FIG. 30 illustrates a top view of the drill bit fully penetrating the bomb. As may be seen in FIG. 30, pneumatic cylinder 416 has driven, by way of piston 417, drill head assembly 166 toward bomb 164. Drill bit 332 has fully penetrated the bomb cap 165 thereby suggesting that the bomb is prepared for the inerting process. As drill head assembly 166 advances toward bomb 164, collar assembly 318 is driving rearward until it engages a micro-switch arm (micro-switch arm 360 of FIG. 17) thereby engaging a drill depth micro-switch (drill depth micro-switch 372 of FIG.

17). Engaged micro-switch generates a signal halting the drilling function and setting the fluid pumps to high pressure for a period of time sufficient to render bomb 164 inert. As will be described later, a method of the present invention includes cutting the bomb only after it has been rendered inert. A blade 478 of band saw 408 may be seen in which the blade rotates about a pair of rotating guides 482 and are driven by a band saw drive 484.

As may be seen, the band saw shown generally at 408 is installed in a physical location above bomb 164 and is mechanically coupled to rotate about an axis to enable the band saw 408 to move in a substantially downward direction to cut the bomb into multiple pieces. A blade 478 of band saw 408 may be seen in which the blade rotates about a pair of rotating guides 482 and driven by a band saw drive 484.

Figure 31:
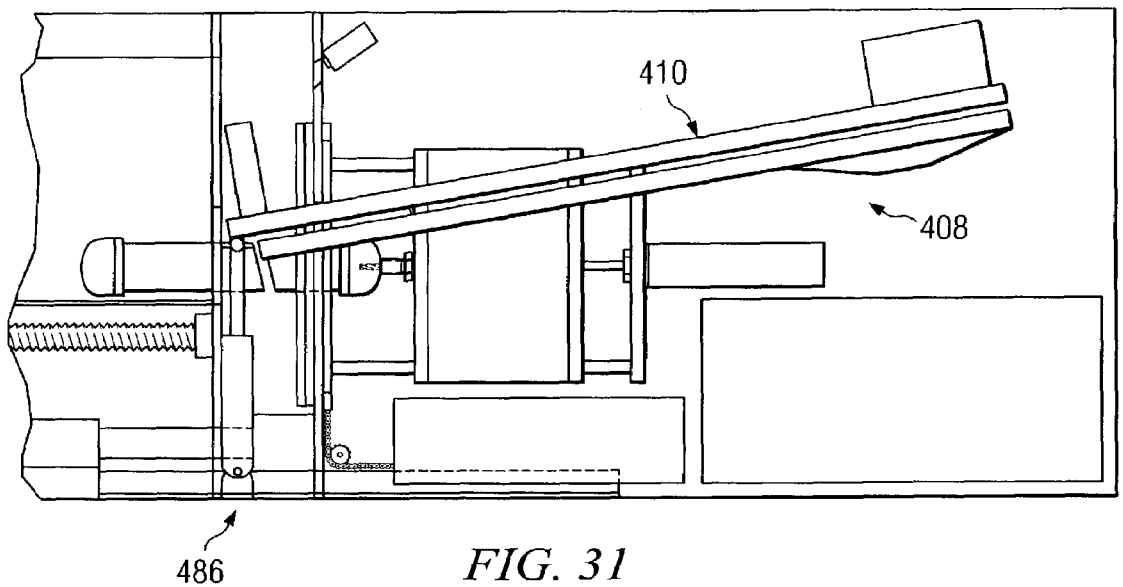
FIG. 31 illustrates the band saw rotated about a pivot point to cut the bomb.

FIG. 31 illustrates band saw 408 rotated about pivot point 410 in a generally downward direction by a pneumatic actuator 486 to cut bomb 164 into at least two pieces thereby confirming that the inerting process was successful. In operation, the band saw will typically cut the bomb in a plurality of pieces.

Figure 32:
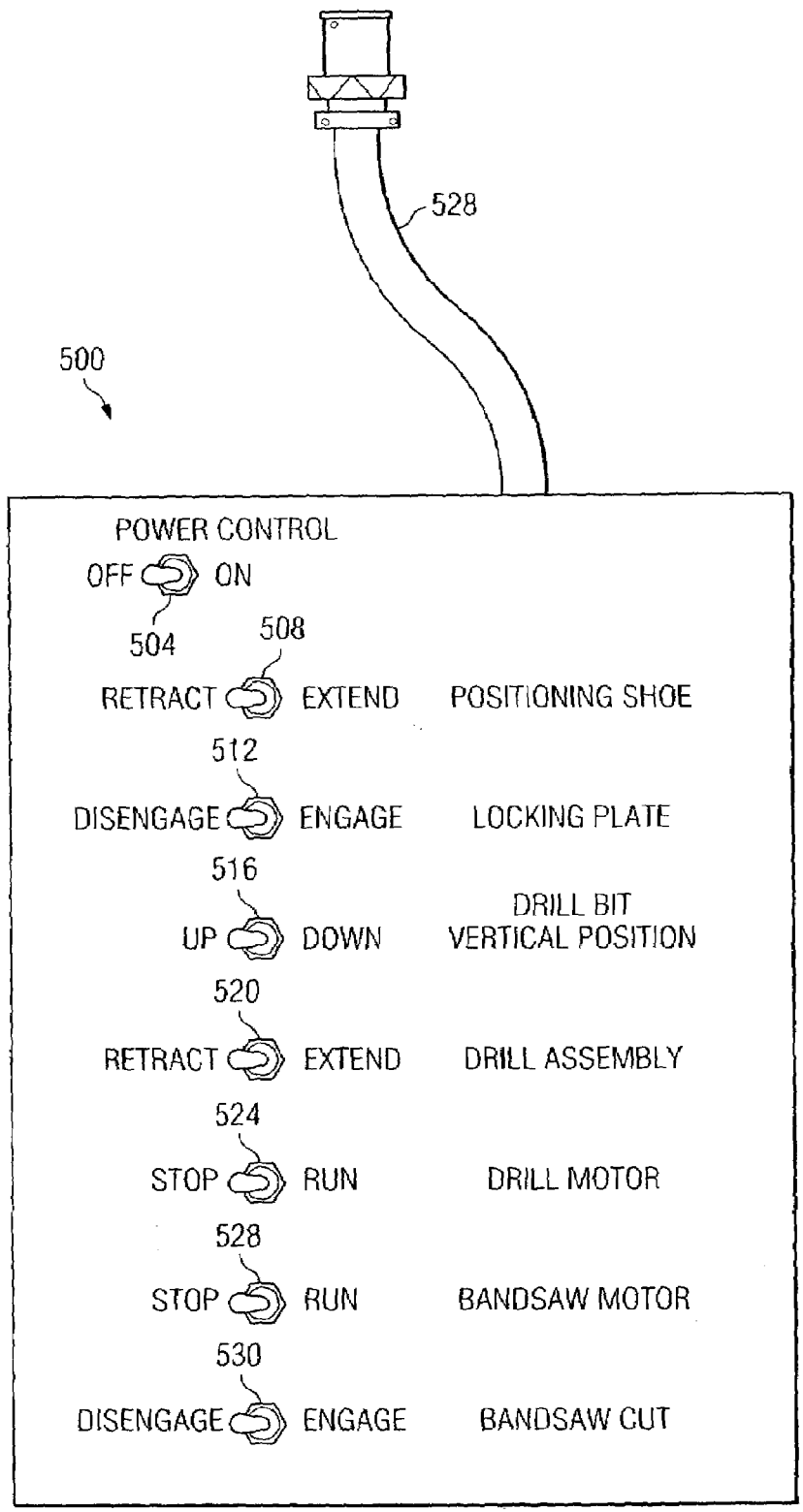
FIG. 32 is a front view of a control panel and umbilical cord of a bomb deactivator formed according to one embodiment of the present invention.

FIG. 32 is a front view of a control panel, shown generally at 500, and umbilical cord 528 of a bomb deactivator formed according to one embodiment of the present invention. A control panel shown generally at 500 includes a power switch 504 for activating the start-up sequence and applying power to the cameras, as well as control switch 508 for controlling the position of the push shoe, control switch 512 for controlling the locking plate, control switch 516 for controlling the vertical position of the drill bit, control switch 520 for controlling the horizontal position of the drill assembly, control switch 524 for controlling the drill motor and drilling fluid pumps (on and off), control switch 528 for controlling the band saw motor (turning it on and off), and a control switch 530 for controlling the activation of pneumatic cylinders to cause the band saw blades to engage the bomb for the cutting operation.

In the described embodiment of the invention, the described controls are implemented in a way to give independent control of any element of the bomb deactivator that performs a specified function except that fluid injection and drilling are simultaneously controlled by control switch 524 and fluid delivery and sawing are simultaneously controlled by control switch 528. Additionally, the drill motor and fluid pumps are also controlled by internal micro-switches and controllers.

Alternatively, some of the specified functions may be combined and controlled by one switch. The inventor has developed, as seen in the described embodiment, a system that maximizes one's ability to control the bomb deactivation procedures. In general, control switch 508 is used to cause the positioning shoe to urge the bomb forward through the locking plate, while control switch 512 is used to extend the locking plate downwards towards the bomb until the locking plate holds the bomb securely in place. Control switches 516 and 520 control the vertical and horizontal position of the drill head assembly. Control switch 524 is for applying power to the drill head assembly to cause the drill bit to turn to penetrate the bomb itself. In the described embodiment of the invention, activation of the drill function further results in activation of the pumping of the fluid to render the bomb inert through the fluid supply. Even prior to the drill penetrating the bomb cap, it is desirable to supply fluid to the drill location so as to reduce heat and the likelihood of sparking or inadvertent combustion. Accordingly, the drill fluid is pumped whenever the drill bit is being turned. Once the drilling function is complete, the band saw motor may be engaged to cause the blades to turn and a fluid supply is activated as the band saw itself is engaged, by control switch 530, to cut the bomb in two or more pieces. The fluid supply is activated to provide a spray at the approximate area the band saw blade engages the bomb to provide cooling, prevent sparking, and work away debris.

Control panel 500 is part of a control station (not shown), the control station comprising control panel 500, umbilical cord 528, at least two liquid crystal display (LCD) monitors, and a battery pack installed in a portable case. The battery pack provides operating power for the LCD monitors only, whereas operating power for other control station functions is provided by the power supply installed in the self contained mobile chassis.

In an alternate embodiment, the umbilical cord is replaced by wireless communication technology. Specifically, wireless transceiver circuitry is included in both the control station and the electronic control center of the bomb deactivator. The control station sends and receives control signals by way of a wireless communication link conforming to one of a Bluetooth or 802.11 protocols. Additionally, the wireless communication link can be encrypted, as is known by on average skill in the art, to make the bomb deactivator communications secure.

Figure 33:
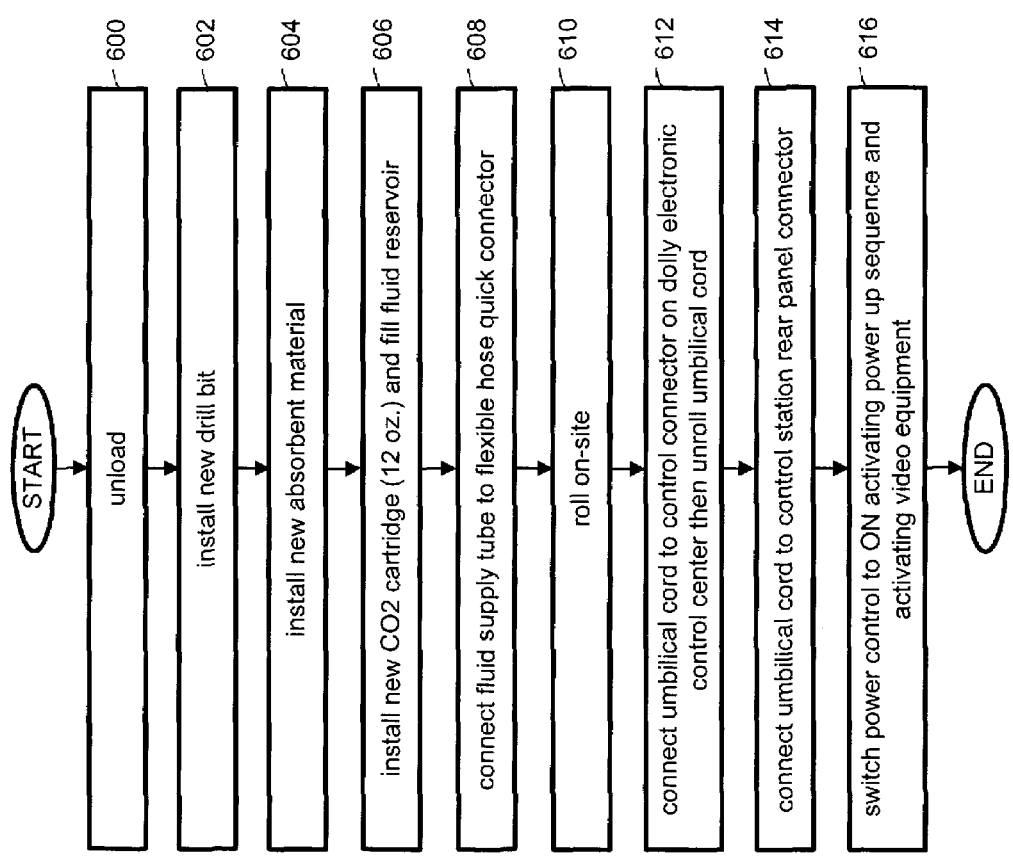
FIG. 33 is a flowchart that illustrates one method of an embodiment of the invention.

FIG. 33 is a flowchart that illustrates one method of an embodiment of the invention. Primarily, the method of FIG. 32 is one that relates to preparing a bomb for deactivation. Initially, the bomb deactivator is unloaded from a vehicle used to carry it to a site that has, or potentially has, a bomb to be deactivated (step 600). Once the bomb deactivator has been unloaded from the vehicle, a new drill bit is installed (step 602). New absorbent material is installed (step 604). The absorbent material catches the excess fluid and material removed during the drilling process. A $CO_2$ cartridge is installed and the fluid reservoir is filled with fluid that is used to render the bomb inert (step 606). In the described embodiment of the invention, the fluid that is used to fill the fluid supply in step 606 comprises a solution that includes alcohol and water. Thereafter, connect the fluid supply hose to the quick connector on the flexible hose (step 608). These steps may be performed in different orders.

Once steps 600–608 are completed, the bomb deactivator is rolled out to the site where a potential bomb is to be deactivated (step 610). The umbilical cord is removed from the control station, connected to control connector on the dolly electronic control center then unroll the umbilical cord (step 612). The other end of the umbilical cord is connected to a control station rear panel connector (step 614). In the described embodiment of the invention, the umbilical cord is a 100-ft. long umbilical cord equipped with a military specification (MIL-SPEC) connector. The umbilical cord is for providing control signals from the control station to the bomb deactivator, as well as for providing video images from one or more cameras within the bomb deactivator to be displayed upon one or more display devices that are viewed by a technician while rendering a bomb inert. The control station power supply is turned on thereby activating a power up sequence and activating video equipment to verify the bomb deactivator is operational, In the described embodiment, a first camera head is installed in the drill head assembly to allow viewing of the trough, bomb securing functions, and drilling operation. The first camera facilitates viewing the penetration of the bomb by the drill bit. A second camera installed on a bulkhead allows for viewing band saw cutting operation, for those embodiments that include a band saw. Once each of the steps 600 through 616 have been followed and implemented, a procedure for rendering the bomb inert, or deactivating the bomb, may be followed. Moreover, while the above steps have been listed in a particular order, it is understood that some of the order of the steps may be modified. For example, installing the $CO_2$ cartridge in step 606 may be performed prior to loading the bomb deactivator within a vehicle for transportation to a site having a bomb to be deactivated. Similarly, the drill bit may also be installed in advance. Finally, even the fluid supply may be filled with the fluid to render the bomb inert in advance.

With respect to the fluid that is filled in the fluid supply, one embodiment of the present invention includes using water. An alternate embodiment includes using a combination of distilled water and denatured alcohol. For example, one solution includes a 25% ratio of distilled water to a 75% ratio of denatured alcohol. This particular solution is advantageous for use with bombs that may include a flash powder, or binary powder, such as one using atomized magnesium.

As is known by one of average skill in the art, atomized magnesium in water can cause a semi-violent reaction that can create a large mess. Moreover, a bi-product of the reaction is hydrogen, in some cases, which is a volatile and dangerous element. Thus, using a solution that includes 75% denatured alcohol significantly reduces the amount of reaction between water and atomized magnesium and therefore the amount of hydrogen that is produced as a bi-product. Additionally, using higher alcohol concentrations is advantageous because the alcohol evaporates which helps with forensic studies of the pipe bomb materials.

In general, it is advantageous to mix at least some alcohol with the water because the alcohol causes the surface tension of the water to break down and therefore facilitates faster propagation of the inerting fluid through the powder of the pipe bomb. In an alternate embodiment of the invention, however, the fluid comprises 25% denatured alcohol and 75% water. This solution is advantageous if a flash powder is not likely to be found within the pipe bomb because the lower amount of alcohol reduces the likelihood of an incidental fire and, if such a fire erupts, a lower temperature fire is produced. Moreover, the percentage of alcohol to water is adequate to sufficiently break down the surface tension of water to enable reasonably quick propagation through the powder to render the explosive powder inert.

Figure 34:
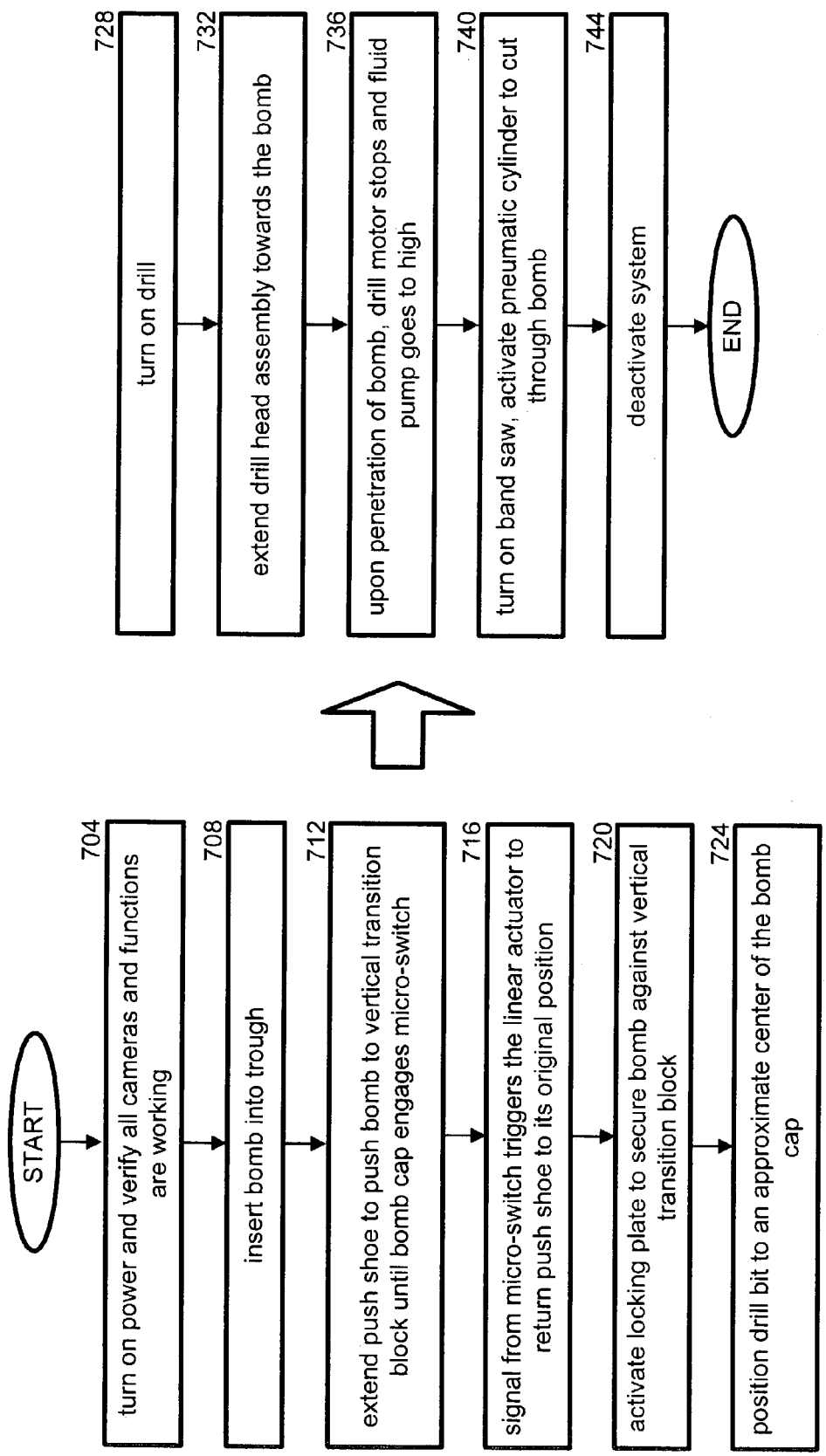
FIG. 34 is a method that illustrates a procedure for rendering a pipe bomb inert.

FIG. 34 is a method that illustrates a procedure for rendering a pipe bomb inert. Initially, a power switch is powered on to activate a bomb deactivator that has been placed on site to verify all cameras and functions are working properly (step 704). The bomb is placed within the bomb deactivator trough (step 708). Thereafter, the push shoe is extended to push the bomb to a vertical transition block until the bomb cap reaches a specific stopping point (step 712). In the described embodiment, the bomb is pushed until the front cap engages a micro-switch. In an embodiment that is comprised of a fingered aperture, the pipe bomb is pushed with the shuttle push shoe through the finger aperture. For example, the push shoe is controlled by activating control switch 508 of FIG. 32 to cause the positioning shoe to receive power to push the bomb.

Once the bomb has engaged the micro-switch in the described embodiment, the signal from the micro-switch triggers the linear actuator assembly to return the push shoe to the original position (step 716). Next, the locking plate is activated to secure the bomb against the vertical transition block (step 720). Thereafter, the drill bit is positioned to an approximate center of the bomb cap (step 724). The drill is turned on to allow the drill to reach operating speed (step 728). Once the drill is at operating speed, the drill head assembly is extended toward the bomb and inerting/cooling fluid is expelled (step 732). For example, in FIG. 32, control switch 520 would be activated to extend the drill head assembly to the bomb that is secured by the locking plate. Once the drill bit reaches the bomb, the drill head assembly is linearly extended until the drill bit penetrates the bomb cap. Thereafter, in the described embodiment, the drill is turned off, and the fluid pump goes to high (step 736) in order to inject maximum fluid into the bomb to render it inert. The fluid is pumped into an opening created in the bomb cap by the drill bit for approximately 4–5 minutes in the described embodiment of the invention. According to the composition fluid solution and size of the bomb, however, this amount of time may readily be varied. Once the bomb has been rendered inert, the band saw is turned on and pneumatic cylinders are activated to pull the band saw down to cut through the pipe bomb (step 740). Thereafter, the system is deactivated (step 744).

The method of FIG. 34 is one that primarily includes an embodiment of the invention that includes not only a linear actuator assembly that may be used to move the bomb, but also a drill bit assembly that may be moved by a pneumatic cylinder or cartridge. Moreover, the method of FIG. 34 is one that includes a bomb deactivator that includes a band saw. Many embodiments of a bomb deactivator have been described herein. Accordingly, the above method may readily be modified to omit any step that relates to an element not found in a particular embodiment of a bomb deactivator.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A drill bit assembly, comprising:
hex stock;
a drill bit permanently installed within an aperture of a hex stock;
a tool bit holder assembly formed as a part of a gear drive of a motor assembly;
a conducting tube having an inside surface of a first specified diameter and an outside surface having a second diameter wherein the conducting tube is machined to scalingly mate with an internally machined flange within the hex stock to prevent the fluid from leaking between the drill bit, the conducting tube and the hex stock;
a sleeve mounted about the conducting tube, the sleeve bored and threaded and cut flush to substantially mate with the outside surface of the conducting tube; and
an elbow connector mounted within the sleeve, the elbow connector for receiving a fluid from a tube coupled thereto and for conducting the fluid into the sleeve and into the conducting tube.

2. The drill bit assembly of claim 1 wherein the sleeve is permanently attached to the conducting tube.

3. The drill bit assembly of claim 2 wherein the sleeve is permanently attached to the conducting tube with an adhesive.

4. The drill bit assembly of claim 2 wherein the sleeve is permanently welded to the conducting tube.

5. The drill bit assembly of claim 1 further including a telescoping conduction tube for conducting fluid about the drill bit as it rotates and into an opening created by the drill bit.

6. The drill bit assembly of claim 5 wherein the telescoping conduction tube for conducting fluid about the drill bit slidingly mates with the conduction tube and axially slides about the conduction tube.

7. The drill bit assembly of claim 6 wherein the telescoping conduction tube for conducting fluid about the drill bit as it rotates substantially sealingly mates with the conduction tube to minimally leak the fluid.

8. The drill bit assembly of claim 1 wherein the hex stock is ¼" hex stock.

9. The drill bit assembly of claim 1 wherein the tool bit holder is a ¼" tool bit holder.

10. The drill bit assembly of claim 1 further including a quick coupler coupled to the tube connected to the elbow, the quick coupler for quickly and easily coupling to a source for the fluid.

11. The drill bit assembly of claim 1 further comprising a drill depth sensor ring formed at an end opposite a drilling point of the drill bit.

12. The drill bit assembly of claim 1 further comprising a collar formed at an end opposite a drilling point of the drill bit.

13. The drill bit assembly of claim 1 further comprising a telescoping tube wherein the telescoping tube defines a 45 degree cut at a drilling point end of the drill bit, wherein the 45 degree cut flushes cutting debris away from the drill bit thereby substantially reducing clogging of the fluid conduction tube.

14. A method for drilling with a drill bit assembly, comprising:

rotating a drill bit having a drill point at a first end;
receiving fluid from a fluid source by;
conducting the fluid along a conduction tube towards the first end;
conducting the fluid along a telescoping tube towards the first end;
axially urging the drill bit into an object being drilled;
injecting the fluid into the object being drilled and about the drill bit; and
axially maintaining the telescoping tube in a position while the drill bit and conduction tube are axially urged into the object and axially pass through the telescoping tube.

15. The method of claim 14 further including injecting the fluid at an increased rate once telescoping tube and the conduction tube reach a defined relative position.

16. The method of claim 15 further including detecting with a switch that the telescoping tube and the conduction tube have reached the defined relative position.

17. The method of claim 16 wherein the switch generates a signal to stop the urging of the drill bit in the first direction and a signal that prompts the injecting of the fluid at an increased rate.

18. The method of claim 14 wherein the fluid is injected for a specified period of time after the object has been penetrated by the drill bit.

19. The method of claim 14 wherein the object comprises a bomb and the fluid comprises an inerting fluid.

20. The method of claim 19 wherein the inerting fluid comprises water.

21. The method of claim 19 wherein the inerting fluid comprises alcohol.

* * * * *